United States Patent [19]

Sudo

[11] Patent Number: 5,815,314
[45] Date of Patent: Sep. 29, 1998

[54] IMAGE DISPLAY APPARATUS AND IMAGE DISPLAY METHOD

[75] Inventor: Toshiyuki Sudo, Kawasaki, Japan

[73] Assignee: Canon Kabushiki Kaisha, Tokyo, Japan

[21] Appl. No.: 950,884

[22] Filed: Oct. 15, 1997

Related U.S. Application Data

[63] Continuation of Ser. No. 363,360, Dec. 23, 1994, abandoned.

[30] Foreign Application Priority Data

Dec. 27, 1993 [JP] Japan .................................. 5-330727

[51] Int. Cl.$^6$ .................................................. G02B 27/24
[52] U.S. Cl. ......................... 359/472; 359/462; 359/471; 345/31; 348/42; 348/55
[58] Field of Search .................................. 359/196, 211, 359/214, 215, 462, 464, 470, 471, 472, 479, 832; 345/6, 31; 348/42, 51, 55

[56] References Cited

U.S. PATENT DOCUMENTS

| | | | |
|---|---|---|---|
| 3,737,567 | 6/1973 | Kratomi | 359/464 |
| 4,649,425 | 3/1987 | Pund | 359/464 |
| 4,853,769 | 8/1989 | Kollin . | |
| 4,893,898 | 1/1990 | Beard | 359/464 |
| 4,922,336 | 5/1990 | Morton . | |
| 5,148,310 | 9/1992 | Batchko | 359/462 |
| 5,166,831 | 11/1992 | Hart | 359/832 |
| 5,253,108 | 10/1993 | Latham | 359/482 |
| 5,311,220 | 5/1994 | Eichenlaub | 348/55 |
| 5,365,370 | 11/1994 | Hudgins | 359/464 |

FOREIGN PATENT DOCUMENTS

| | | |
|---|---|---|
| A-2151849 | 6/1990 | Japan . |
| A02151849 | 6/1990 | Japan . |
| A-3048233 | 3/1991 | Japan . |
| A03048233 | 3/1991 | Japan . |

OTHER PUBLICATIONS

Patent Abstract of Japan, vol. 15, No. 196 (P–1203), published May 21, 1991, corresponding to Japanese Patent No. A3048233.

Patent Abstract of Japan, vol. 14, No. 400 (P–1098), published Aug. 29, 1990, corresponding to Japanese Patent No. A2151849.

A. Schwartz, "Head Tracking Stereoscopic Display", Proceedings of the Society for Information Display, vol. 27, No. 2, (1986).

*Primary Examiner*—Thong Nguyen
*Assistant Examiner*—Darren E. Schuberg
*Attorney, Agent, or Firm*—Morgan & Finnegan, L.L.P.

[57] ABSTRACT

A stereographic image display apparatus for permitting the observation of a high resolution and sharp color stereographic image of a wide view field without requiring specially designed spectacles, comprises a display device for displaying an image by emitting a light, a focusing optical system for focusing the image displayed on said display device at a different position than that of said display device, and an image moving unit for rotating an image surface of the focusing optical system around one axis in the image surface as a rotation axis.

25 Claims, 26 Drawing Sheets

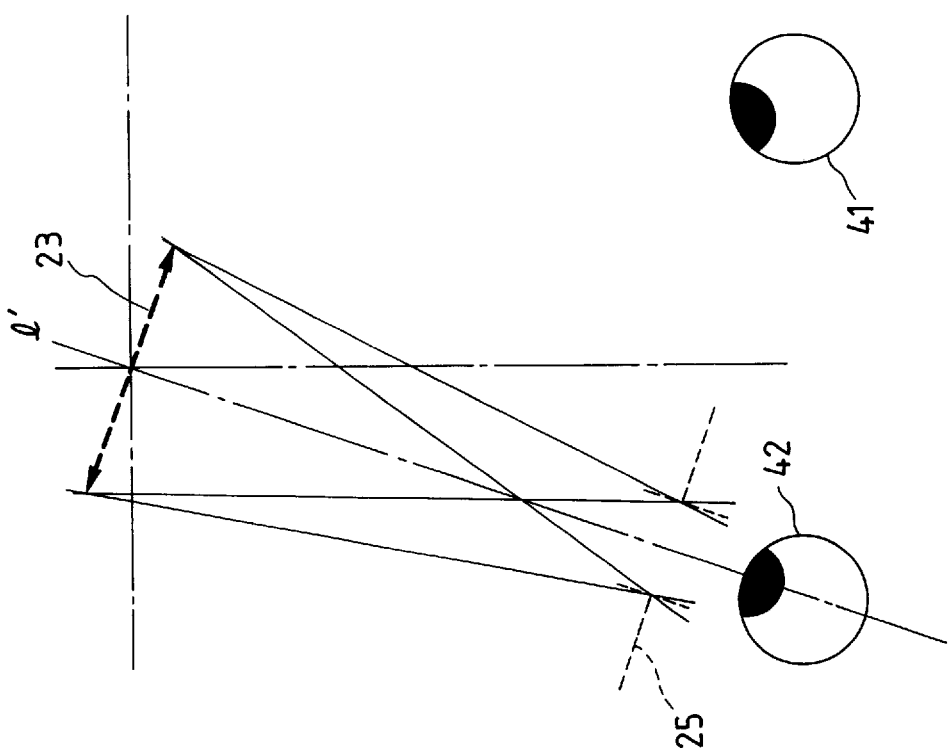
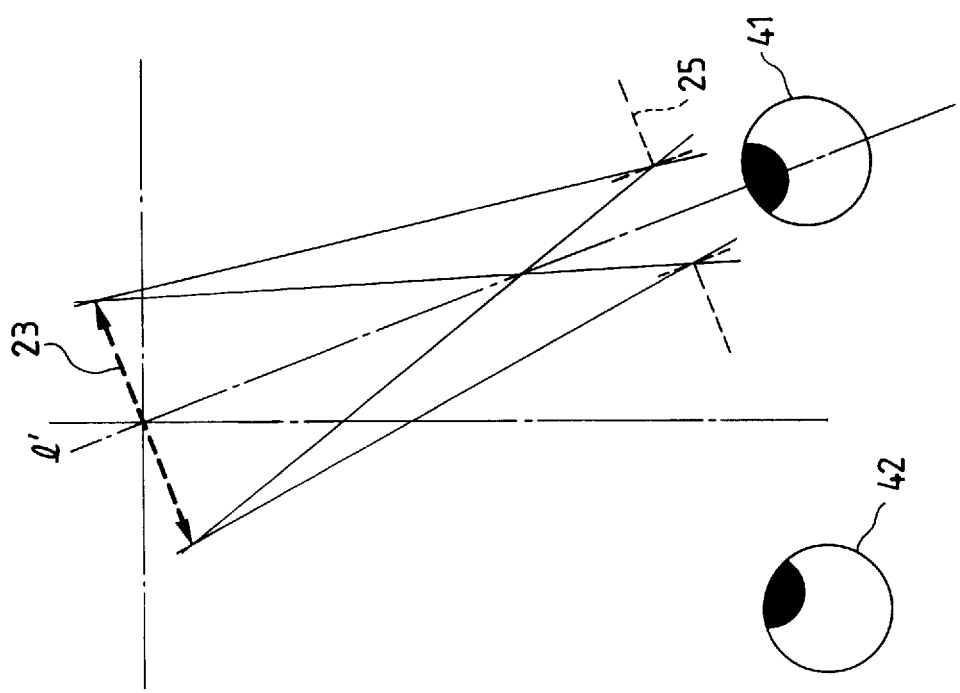

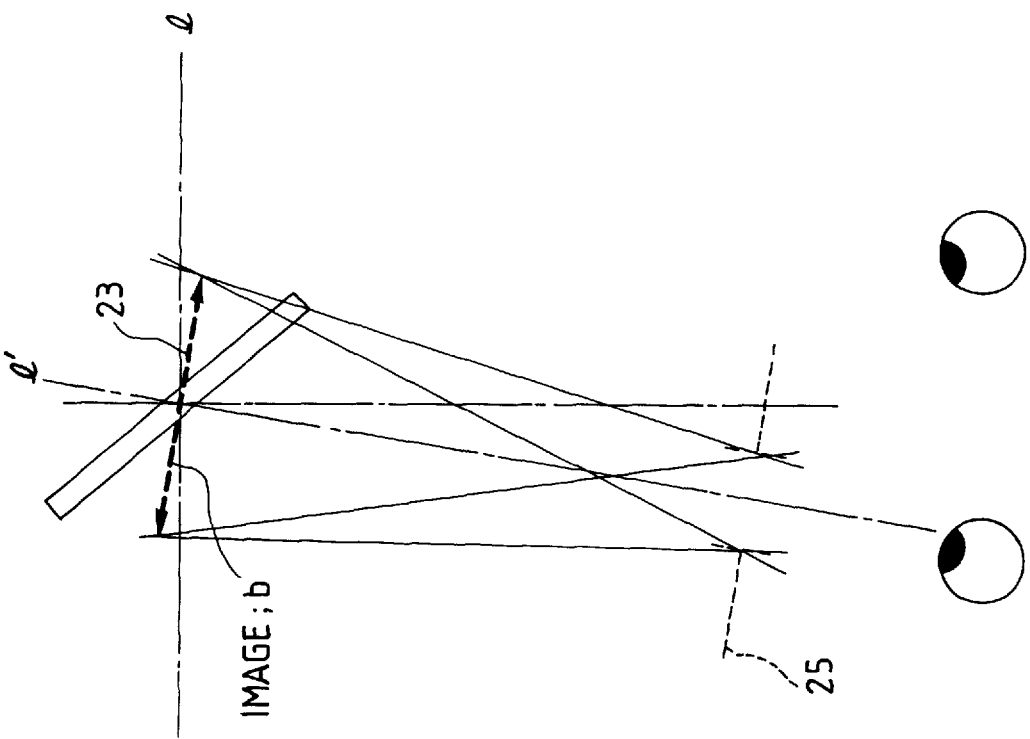
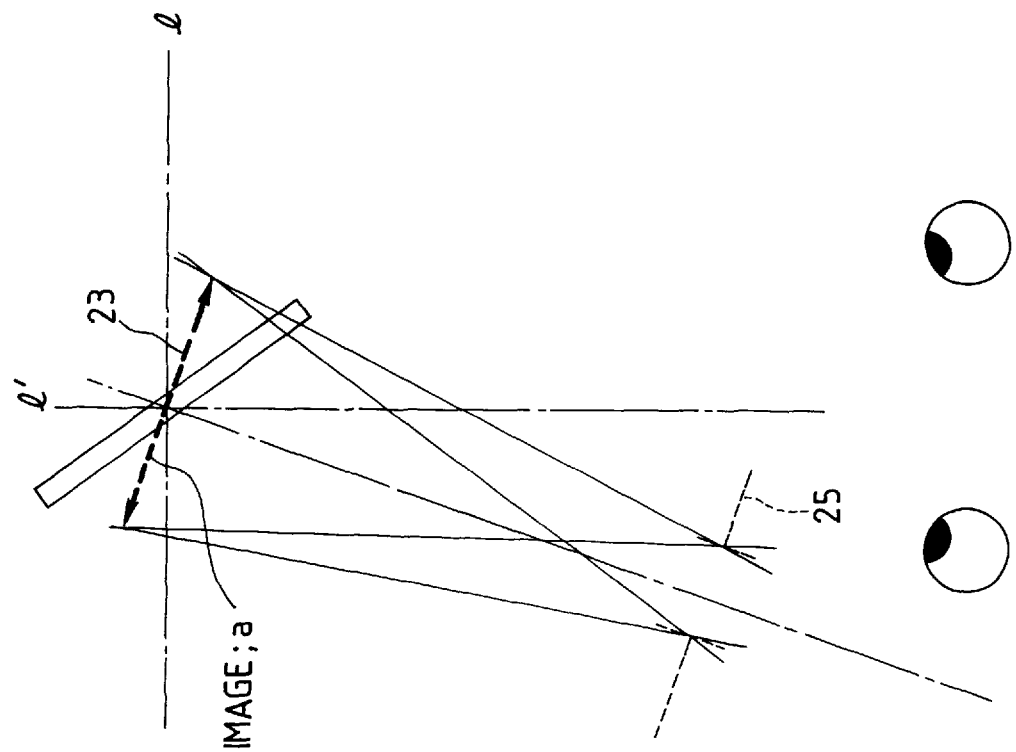

(a)    (b)

IMAGE DISPLAY APPARATUS AND IMAGE DISPLAY METHOD

This is a continuation of application Ser. No. 08/363,360, filed on Dec. 23, 1994, now abandoned.

BACKGROUND OF THE INVENTION

1. Field of the Invention

The present invention relates to a two-dimensional image display apparatus having a wide view area (observation area) and an image display apparatus permitting the observation of a stereographic image without putting a specially designed spectacles, etc. and an image pickup method of an image used therefor.

2. Related Background Art

A well known two-dimensional image display apparatus is a CRT.

The CRT irradiates an electron beam emitted from an electron gun fixed in a vacuum atmosphere to a fluorescent applied in film form to convert it to a light energy, and repeats a two-dimensional scan of the electron beam to form a display screen having a predetermined luminance distribution. In display elements utilizing liquid crystals, the liquid crystals exhibit a property of modulation of polarization in an electric field. It is used as a thinner and lighter display device than the CRT.

On the other hand, various methods for displaying a stereographic image have been attempted. Of those, a most common method utilizes a parallax of both eyes. It independently and exactly presents two-dimensional images for both eyes to the left and right eyes to attain the stereographic view. This method is classified to a method which uses specially designed spectacles and a method which uses a high directivity display screen.

A typical method of using the specially designed spectacles uses liquid crystal shutter spectacles as shown in FIG. 1.

The image display screen merely alternately displays the left and right images and a liquid crystal driver switches the light transmission/interruption of the left and right liquid crystal shutter spectacles in synchronism with the switching of the image. If the switching is effected within a permitted time for a residual image by the eyes (approximately ⅟60 second), a flicker free stereographic image can be reproduced.

A typical example which uses a high directivity display screen is a lenticular method. It uses a lenticular lenses having a number of cylindrical lenses arranged in a horizontal direction. As shown in FIG. 2, images corresponding to left and right eyes are divided into longitudinally elongated shape and they are alternately arranged on a focal plane of the lens plate so that when they are observed through the lens plate, the images for the left eye and right eye are separated according to directional characteristics of the lens plate, so that the stereographic image can become visible.

A depth sampling system has been known as a stereographic image display method which satisfies not only the parallax of the eyes but also a response to the adjustment in depthwise of the eye.

The depth sampling system is defined by a system wherein a plurality of two-dimensional cut images of objects are time-division displayed while the display surface is being moved to causes an image, to be floated in space by utilizing the residual image phenomenon of the eyes.

According to this system, if the position of the eye is moved laterally or vertically, then images as viewed from the respective position can be observed.

FIG. 3 shows an example of display which attains the above effect by rotating a two-dimensional LED array. While the two-dimensional LED array panel is being rotated at a high speed, radially cut sectional images of the object are sequentially displayed in a cylindrical coordinate space in synchronism with the rotation to display the three-dimensional image.

The above general two-dimensional image display apparatus and the three-dimensional image display method have following problems.

Namely, in the above general two-dimensional image display apparatus, the image display screen is planar and an observer who directly faces the display screen can easily observe the image but the observation from a direction having a large angle to a normal line to the display screen is difficult to attain, and the observation from the side or back cannot be attained.

On the other hand, the conventional stereographic/three-dimensional image display methods have the following disadvantages.

(1) Method using the specially designed spectacles

Each time a stereographic image is to be observed, an observer must put the spectacles, which causes to troublesome. Further, as many spectacles corresponding to the number of observers must be provided.

(2) Method using the highly directivity display screen

When the positions of the both eyes of the observer deviate from assumed positions, the image quality is deteriorated by aberration of the lens and diffraction therein.

(3) Depth sampling method

Principally, a reproduced three-dimensional image is destined to become a phantom image (internally perspective view). When a point light source is rotated and synchronously turned on and off, the resolution of the image depends on a size of a point light source, and colorization is difficult to attain.

SUMMARY OF THE INVENTION

It is an object of the present invention to provide a stereographic image display apparatus which allows observation of a high resolution color stereographic image with a wide view field (observation area) without requiring a specially designed spectacles.

In order to achieve the above object, in accordance with the present invention, there is provided an image display apparatus comprising:

display means for emitting a light to display an image, for example, LCD, CRT and plasma display, etc.;

a focusing optical system for focusing the image displayed on said display means at a position different from a position of said display means; and image surface moving means for rotating an image surface of the focusing optical system around one axis in the image surface as a rotation axis.

In a preferred form, the image moving means includes a mirror rotatable around said rotation axis as a rotation axis.

In a preferred form, the image moving means includes a variable apex prism.

In a preferred form, the display means includes means for displaying an image corresponding to a rotated position of the image surface.

In a preferred form, the apparatus further comprises:

means for detecting positions of both eyes of an observer observing the image reproduced on the image surface; and means for controlling the image moving means or the display means on the detected result.

In a preferred form, the apparatus further comprises:

means for adjusting a shape of an exit pupil of the focusing optical system.

In a preferred form, a shape of an exit pupil of said focusing optical system is longer in a direction of the rotation axis than in a direction normal to the rotation axis.

In a preferred form, an exit pupil of said focusing optical system is located closer to an observer observing the image reproduced on the image surface than to the image surface.

In a preferred form, the image moving means requires no longer than 1/30 second to rotate the image surface to the same rotation position.

In a preferred form, the display means alternately displays images of an object picked up from different positions.

In a preferred form, at least two sets of the display means and the focusing optical system are included for the one image moving means.

In a preferred form, the image displayed on said display means is an image picked up by relatively rotating an object and moving image pick-up means around a predetermined axis as a rotation axis.

In a preferred form, the moving image pick-up means is fixed.

In a preferred form, there is provided an image pick-up apparatus comprising:

image pick-up means for picking up an object; and means for rotating at least one of the object and the image pick-up means around a predetermined axis as a rotation axis.

In a preferred form, the image pick-up means is fixed.

The image display apparatus and the image pick-up apparatus of the present invention are now explained in detail in conjunction with the preferred embodiments.

BRIEF DESCRIPTION OF THE DRAWINGS

FIGS. 7A and 7B show a method for observing an image of a wide view field with both eyes by using the apparatus of the present invention.

FIGS. 21A and 21B show a method for observing stereographic images as viewed from various horizontal angles in a horizontal direction.

DETAILED DESCRIPTION OF THE PREFERRED EMBODIMENTS

Embodiment 1

Figure 4:
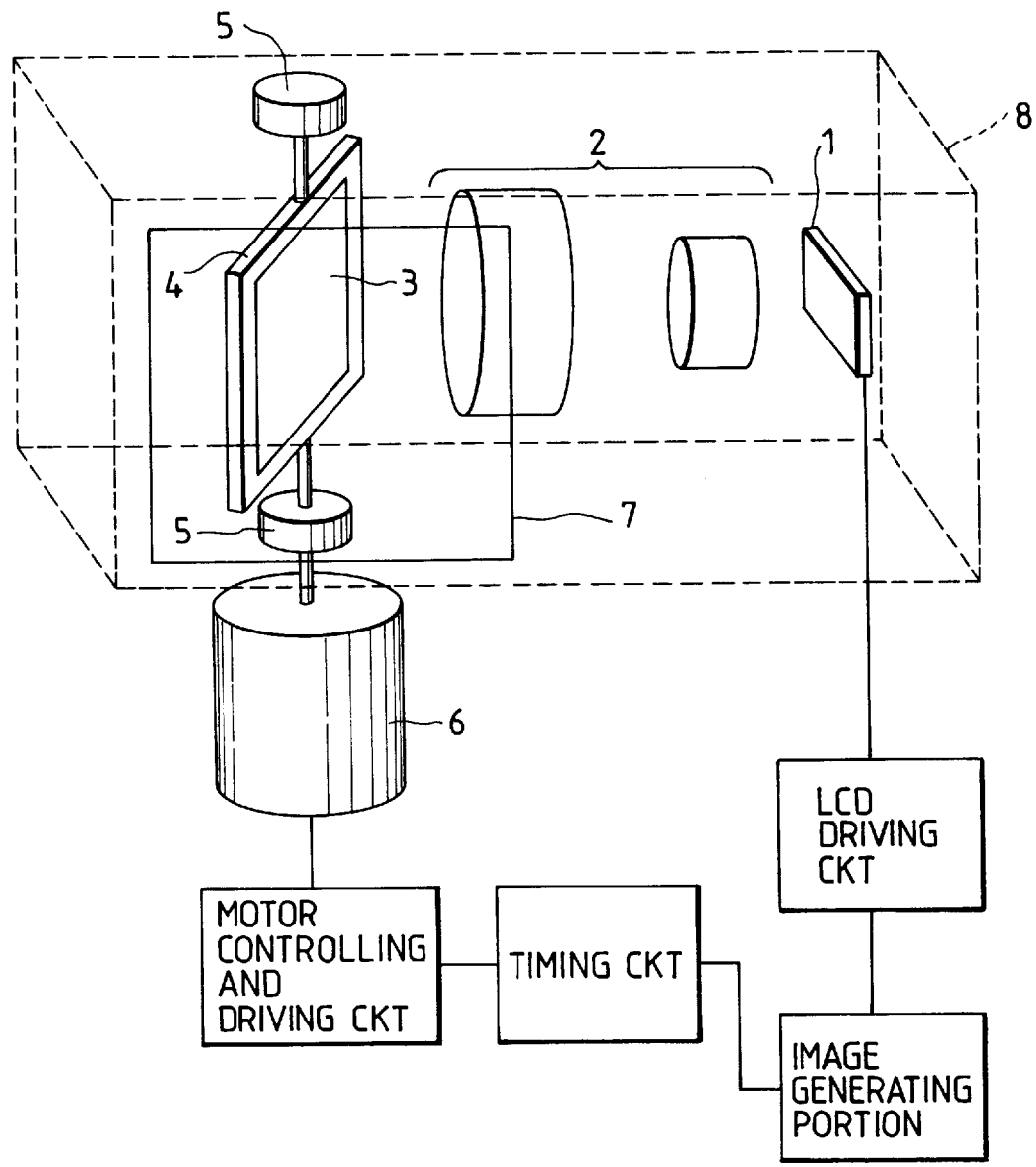
FIG. 4 shows an embodiment of the present invention.

FIG. 4 shows a first embodiment of the present invention.

In FIG. 4, numeral 1 denotes a liquid crystal display device (hereinafter referred to as LCD). Image information generated by an image generating portion is converted to an electrical signal by an LCD drive circuit and it is again displayed on the LCD as an image by an electro-optical effect of the liquid crystal device. The LCD is back-lit from a rear side and the image can be observed as dark and bright information with tonality. Needless to say, the LCD may be used either for a monochromatic image or a color image. While the LCD is used in the present embodiment, the other display device which can permit the display of a two-dimensional image may be used, and a CRT or a movie film or the like may be used.

Numeral 2 denotes an optical system for focusing the above image to another position. It comprises a general lenses.

Numeral 3 denotes a planar mirror which is mounted on a holder 4 with a rotary shaft and a position of a rotating shaft is fixed by a bearing 5. The mirror and the holder can be rotated by the rotation of a motor 6 directly or indirectly connected to the rotary shaft.

The revolution number in motion of the rotation can be exactly controlled by a control and drive circuit connected to the motor.

The motor control and drive circuit generates a signal in synchronism with the rotation and sends it to a timing circuit. Thus, the timing circuit can detect the rotating speed and an angle of the mirror at a given time.

The detected information signal is further sent to an image generation unit, which sends the image signal to an LCD drive circuit in synchronism with the rotation of the rotary mirror to display the image on the LCD.

Numeral 8 denotes a light shield box which is provided to shield needless light other than the display image light.

Numeral 7 denotes an observation window through which an observer observes a reproduced image. In the optical system arrangement of the present apparatus, a light source tracking chart of FIG. 5 is explained.

Figure 5:
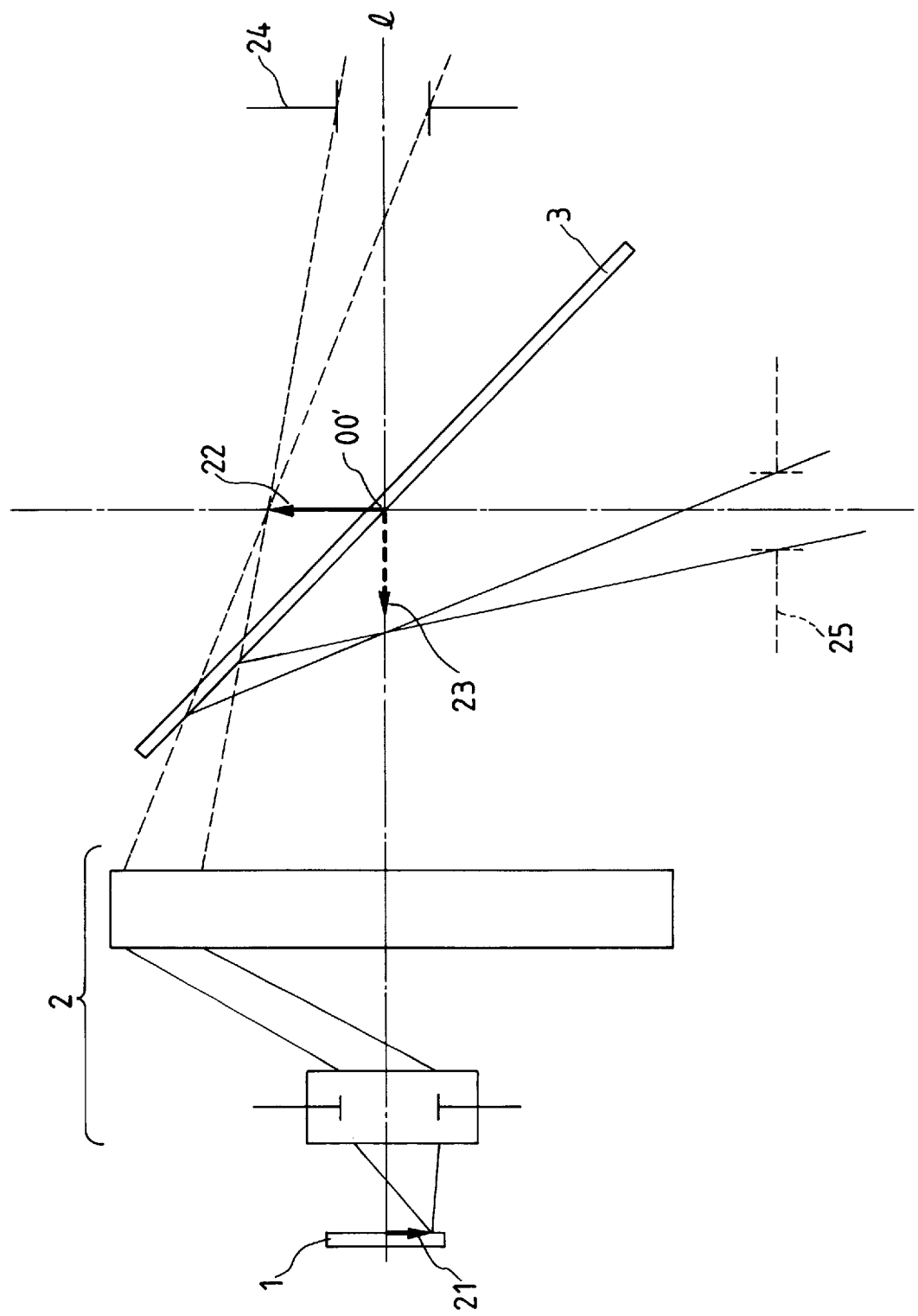
FIG. 5 shows a top view of the apparatus of the present invention.

FIG. 5 shows a view of the present apparatus as viewed from normal top. An image 21 displayed on the LCD 1 is focused as an enlarged image 22.

Figure 1:
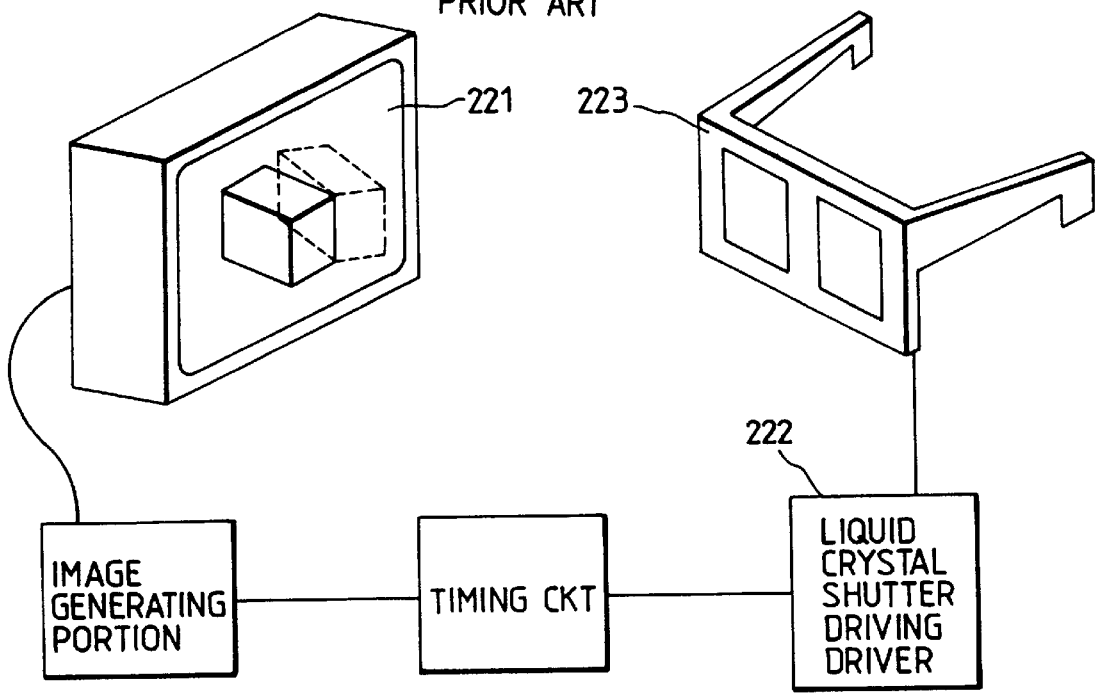
FIG. 1 illustrates a conventional stereographic image display method.
Figure 2:
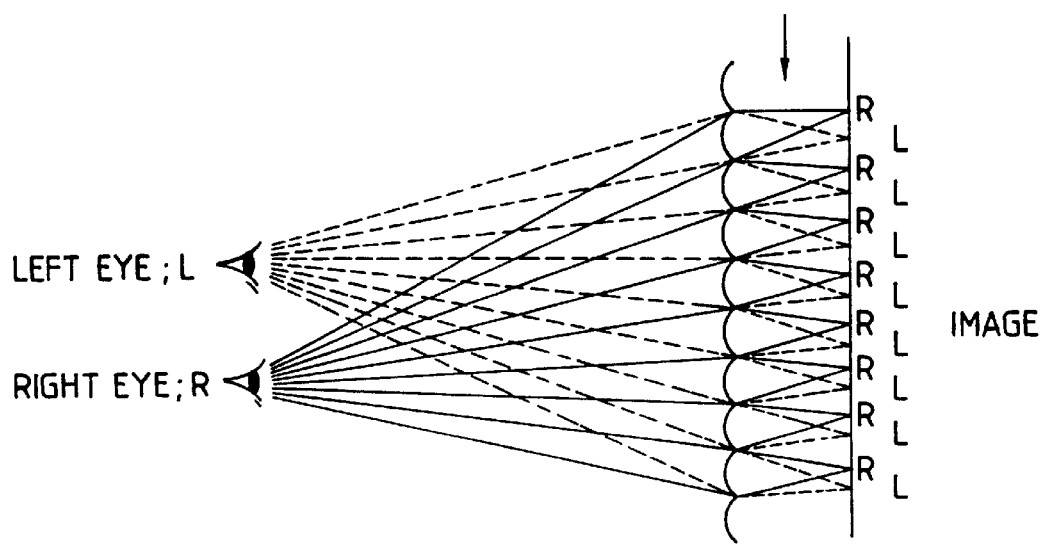
FIG. 2 illustrates a conventional stereographic image display method.
Figure 3:
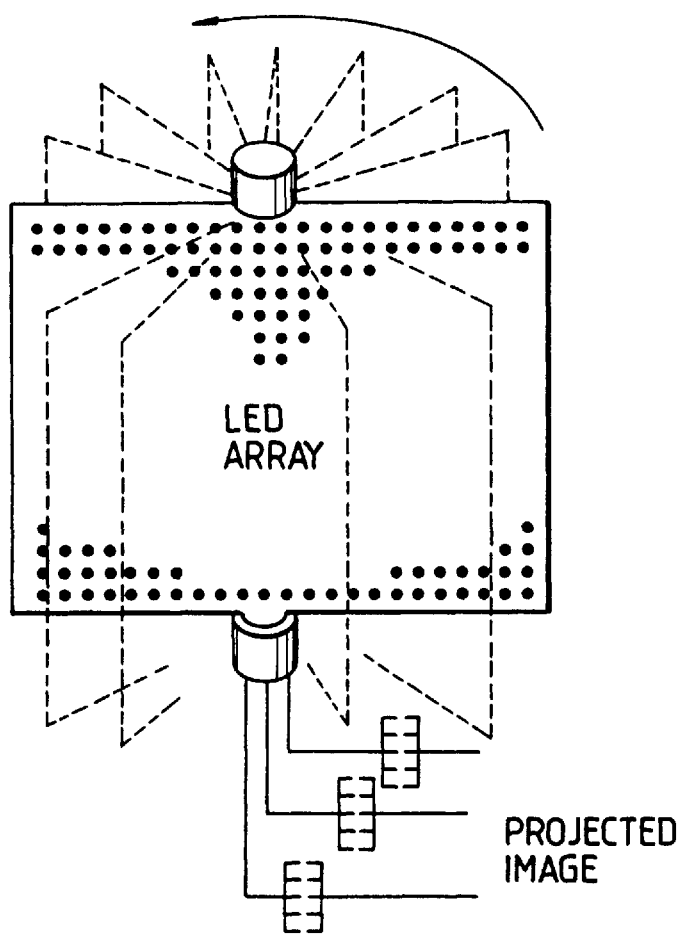
FIG. 3 illustrates a conventional stereographic image display method.

The image 22 is focused on a plane containing a rotation axis OO' of the mirror 3 and being normal to the optical axis 1 of the optical system 2. (However, the image 22 need not be necessarily normal to the optical axis 1 of the optical system 2. It is only necessary that it is focused on a substantial image surface containing the rotation axis of the mirror.) An exit pupil 24 of the optical system 2 is normal to the optical axis 1 and located at a position farther from the optical system 2 than the image 22 is as shown in FIG. 2.

The image 22 and the exit pupil 24 are focused by the reflection of the mirror 3 as an image 23 and an exit pupil 25 at positions reflected back with respect to the mirror.

In FIG. 5, the mirror 3 is angled by 45 degrees to the optical axis 1, but since the mirror 3 may be rotated to change the angle to the optical axis 1, the angle to the optical axis 1 can be changed in accordance with the rotation of the mirror. (However, in the present embodiment, it is assumed that the mirror is rotated clockwise as viewed from the normal top.)

Figure 6:
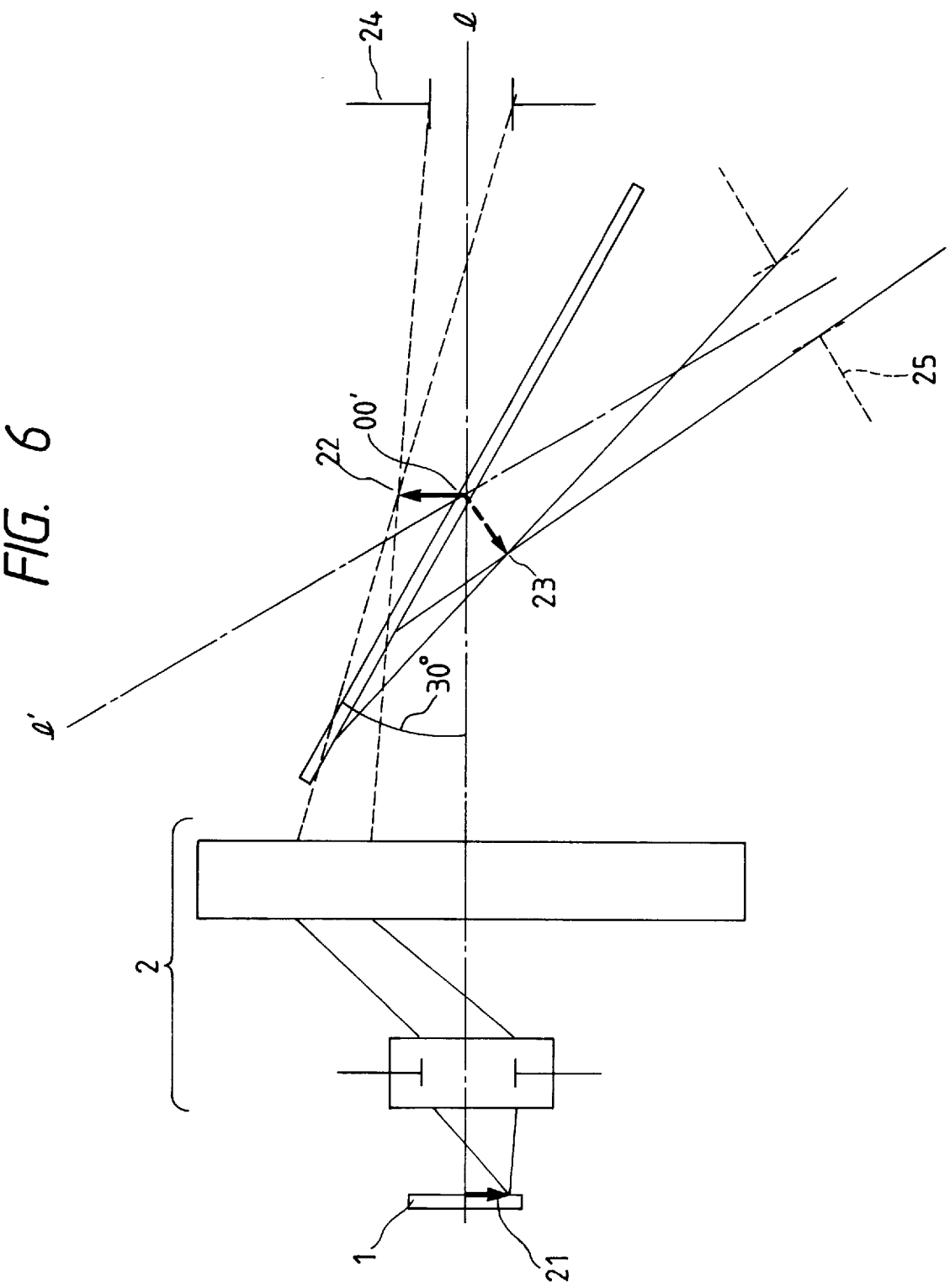
FIG. 6 illustrates a manner of rotating movement of an image and an exit pupil as a mirror is rotated.

For example, when the angle of the mirror 3 to the optical axis 1 is 30 degrees as shown in FIG. 6, the image 23 is focused at 30 degrees to the opposite side of the mirror with respect to the optical axis. The exit pupil 25 is rotated around the rotation axis OO' of the mirror and moved to the position shown in FIG. 6. By continuously changing the angle of the mirror to the optical axis 1, the image 23 and the exit pupil 25 are also continuously rotated. The LCD 1 and the optical system 2 have drive mechanism capable of adjusting a relative position of the image 22 to the rotation axis of the mirror.

In the present apparatus having the above constructed optical system, a method for observing a two-dimensional image of a wide view field with both eyes is explained with reference to FIGS. 7A and 7B. In order to simplify the drawings, the optical system is omitted and only the image 23 which the observer actually views and the exit pupil 25 and the mirror 3 are shown.

In a state of FIG. 7A, the image 23 directly faces a right eye 41 of the observer. The right eye of the observer can observe the image 23 through the exit pupil 25. However, a left eye 42 of the observer cannot observe the image 23 because the light is eclipsed by the exit pupil 25.

Then, after t second has passed from the state of FIG. 7A, the image 23 directly faces the left eye 42 of the observer as shown in FIG. 7B. Now, the left eye of the observer can observe the image 23 through the exit pupil 25 but the right eye of the observer cannot observe the image 23 because the light is eclipsed by the exit pupil 25.

Assuming that the displayed image does not change between the states of FIG. 7A and FIG. 7B, the observer observes the same image by the left and right eyes so that the image appears to the observer as if the observer directly observed the image on the LCD display screen including an axis of the rotational mirror directly facing the observer. However, since the image 23 which the observer observes is a reversed image, the image may be laterally reversed in the image generating portion or a mirror may be inserted in an optical path where the image 23 is formed so that the image is not reversed.

Figure 8:
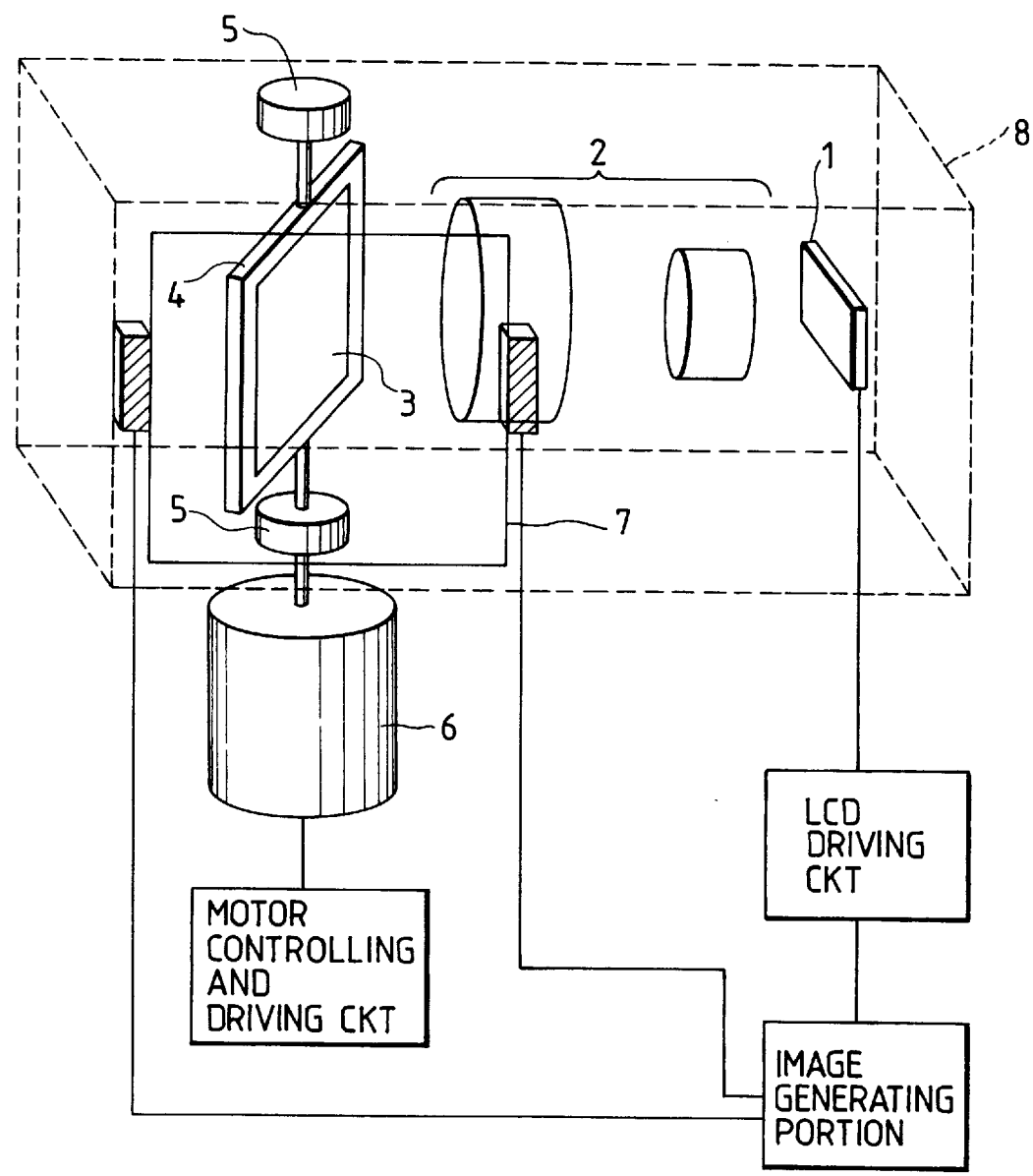
FIG. 8 illustrates for explanation of switching of images.

It is commonly recognized that a residual image time of an eye is approximately $\frac{1}{60}$ second. Thus, by rotating the mirror by 60 revolutions per second and switching the display screen of the LCD such that the image is not observed by the observer, it is possible to observe a flicker free sharp moving image. However, if time required for changing an image is less than $\frac{1}{30}$ second or equal, then the observer can observe an image without caring about the flicker to some extent. Accordingly, rotation of the mirror can be set even at 30 revolutions per second. For example, by detecting by the timing circuit a time at which the rotary mirror 3 is positioned on the same plane as the image 22 or a normal plane to the image 22 at the moment of switching of the image and switching the displayed image in synchronism with that time, the observer substantially dispenses with the switching of the display screen.

Where such an above-mentioned timing circuit is not provided, as shown in FIG. 8 a photo-sensor may be provided in an inside of the light shield box 8 and near the observation window 7, and a time at which the light beam for the image display exits from the observation window and a time at which it is again eclipsed by the light shield box may be detected, and those information signals may be sent to the image generating portion so that the display image switching of the LCD may be conducted at a time at which the light beam for the image display is not incident on the eyes of the observer.

In any case, since the rotary mirror rotates by a high speed, it is necessary that a speed of the switching of the display screen is faster than the speed of the rotation, and the display device such as LCD, CRT or movie film used as the display device is selected to allow sufficiently high speed display.

Figure 9:
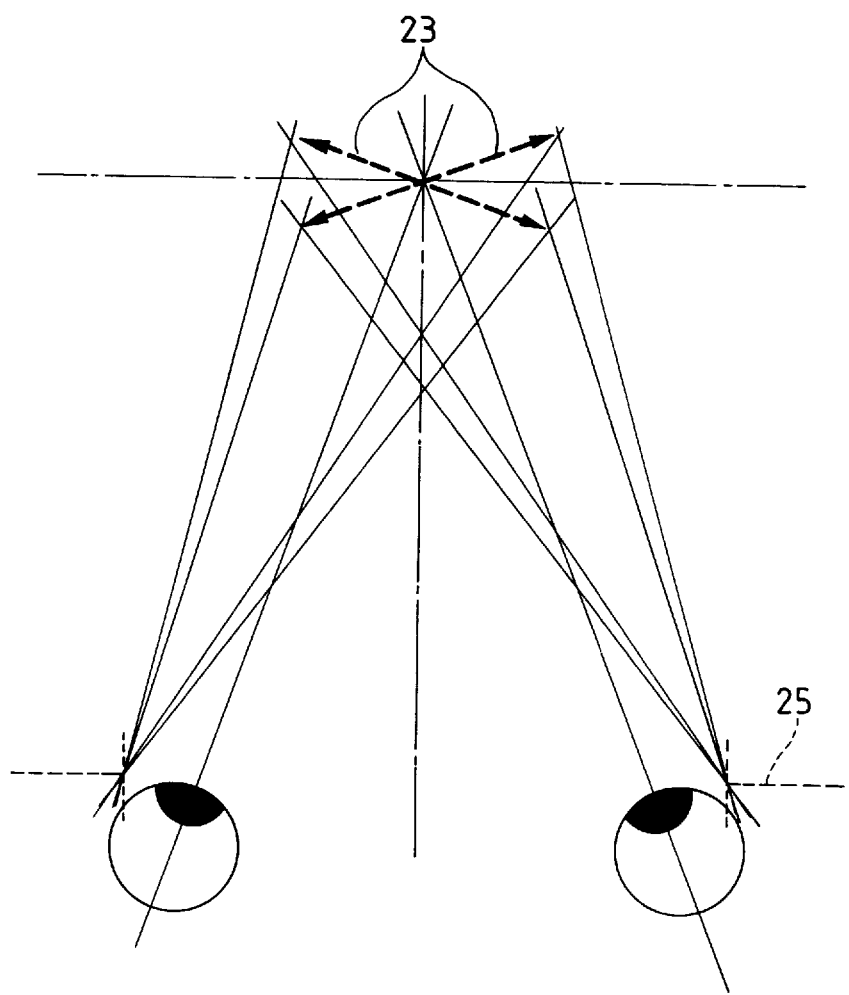
FIG. 9 shows an operation when the exit pupil is set large.
Figure 10A:
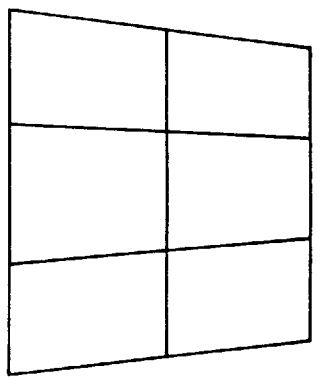
FIGS. 10A and 10B show images observed when the exit pupil is set large.
Figure 10B:
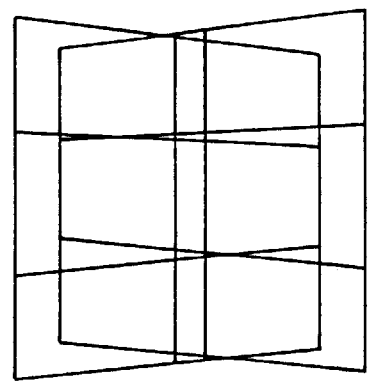

It should be noted that if the exit pupil is set large to the eye, then two images having different inclinations are observed by one eye in overlap as shown in FIG. 9 and the image is hard to recognize as shown in FIG. 10B compared to the image originally viewed by one eye as shown in FIG. 10A.

Accordingly, means is provided to adjust such that the width in a horizontal direction of the exit pupil 25 is sufficiently smaller than the width between the both eyes and sufficiently larger than the diameter of pupil of the eyeball so that the apparatus can cope with the different width between the both eyes and different pupil diameters of different observers.

Figure 11:
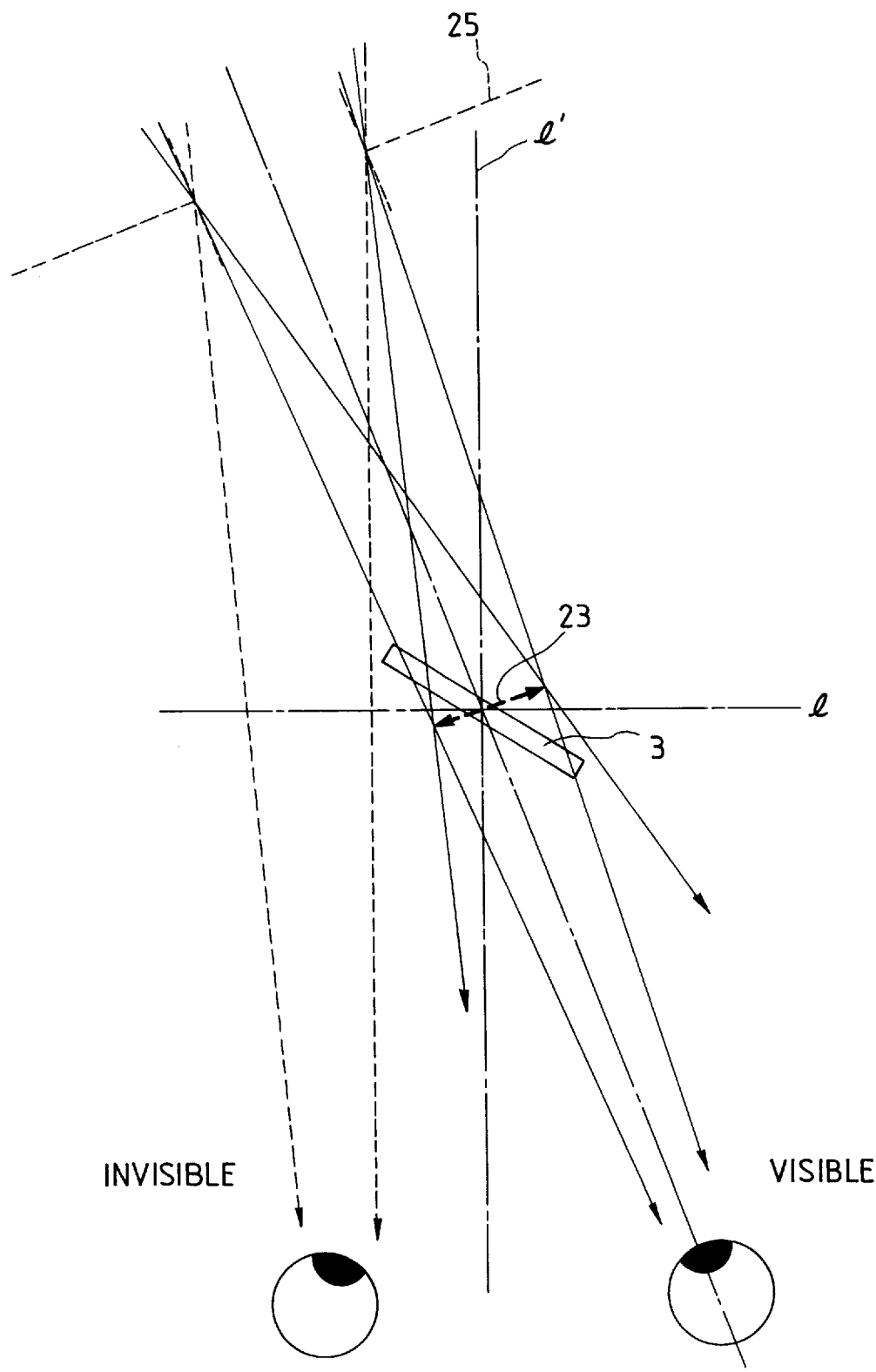
FIG. 11 shows an operation when a position of the exit pupil lies farther than a mirror as viewed from an observer, FIG. 12 show a locus of movement of a center of exit pupil as the mirror is rotated.

The exit pupil 25 need not be located closer to the observer than to the rotary mirror 3. When the exit pupil 25 is farther from the mirror 3 as viewed from the observer as shown in FIG. 11, the same effect as that shown in the embodiment shown in FIGS. 7A and 7B is attained if the light is incident on only one eye due to the size of the mirror. However, since more light is incident on the pupil of the observer when the exit pupil 25 is located closer to the observer, it is applicable to a display device of a low luminance.

In any case, any effect of the present invention is not lost if the state in which the light emitted from the exit pupil of the optical system is incident on the right eye only and the state in which it is incident on the left eye only as the rotary mirror is rotated can be independently created in time.

When the image is observed through the relatively small exit pupil, the eclipse of the image may occur as the position of the eye moves and the like, but since the exit pupil is continuously moved in a horizontal direction in the present apparatus, when the move velocity produces a state as if the image were observed through a horizontally wide pupil in average in time is achieved by the residual image effect of the eye. (However, it is equivalent, at a moment, to observe the image of a small exit pupil.)

This means that the image can be observed from a fairly wide range (by a plurality of observers).

Figure 12:
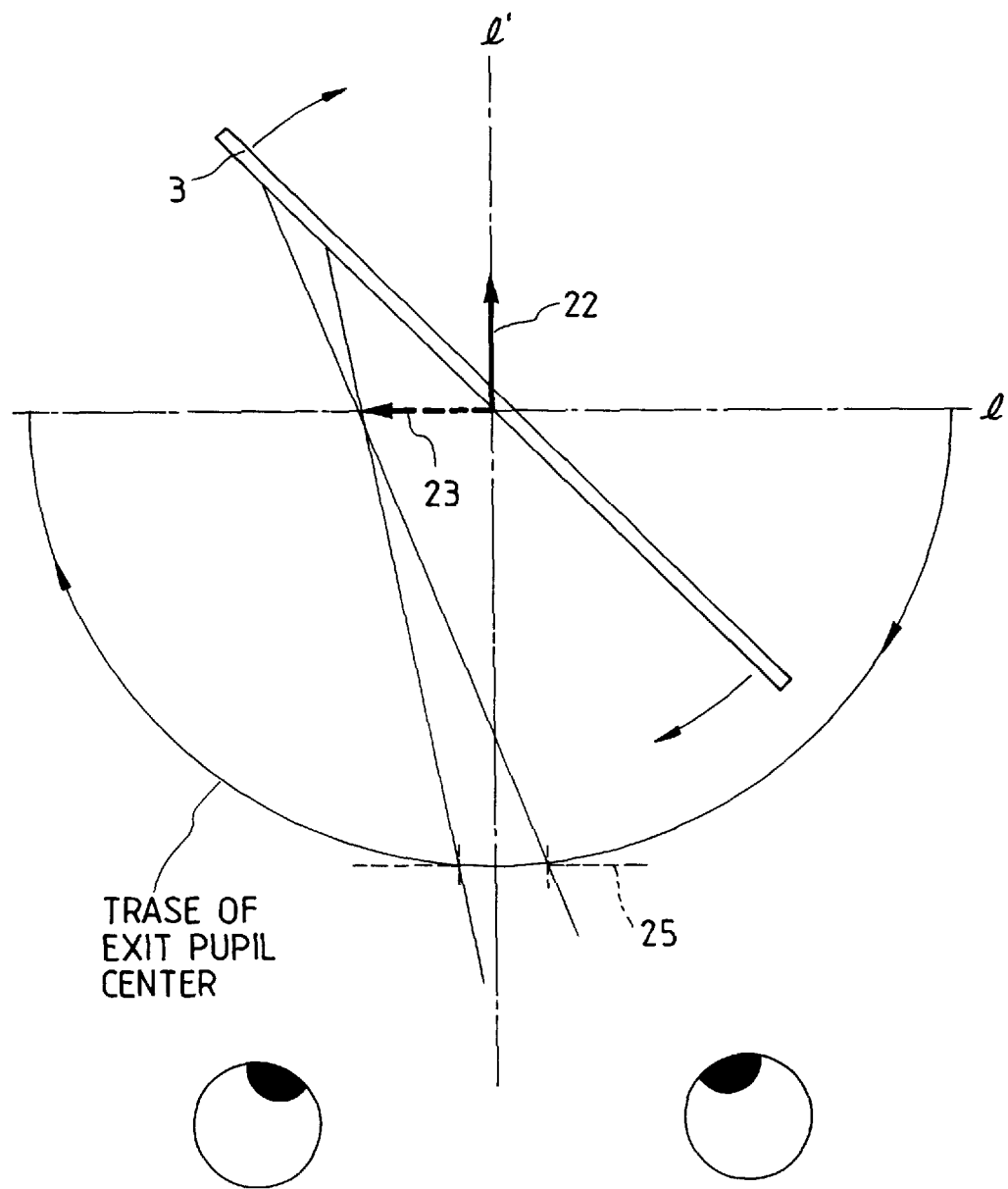

FIG. 12 shows a locus of movement of a center of the exit pupil 25 as the mirror of the present apparatus is rotated. As shown, the image can be observed from a range of 180 degrees.

The following improvements may be added to further improve performance of the present apparatus.

(1) Expansion of view field in a vertical direction

Figure 13A:
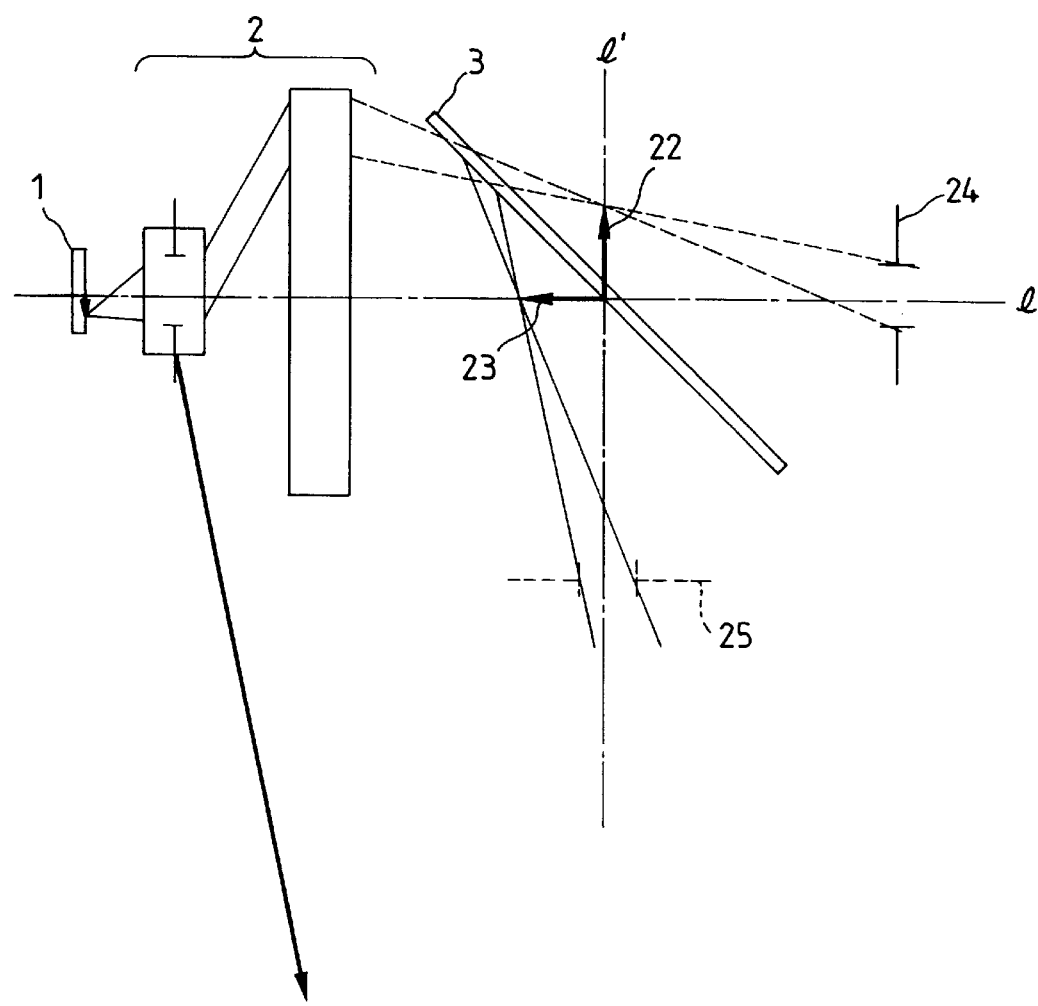
FIGS. 13A and 13B show view field diaphragm shapes for expanding a parallax in a vertical direction.
Figure 13B:
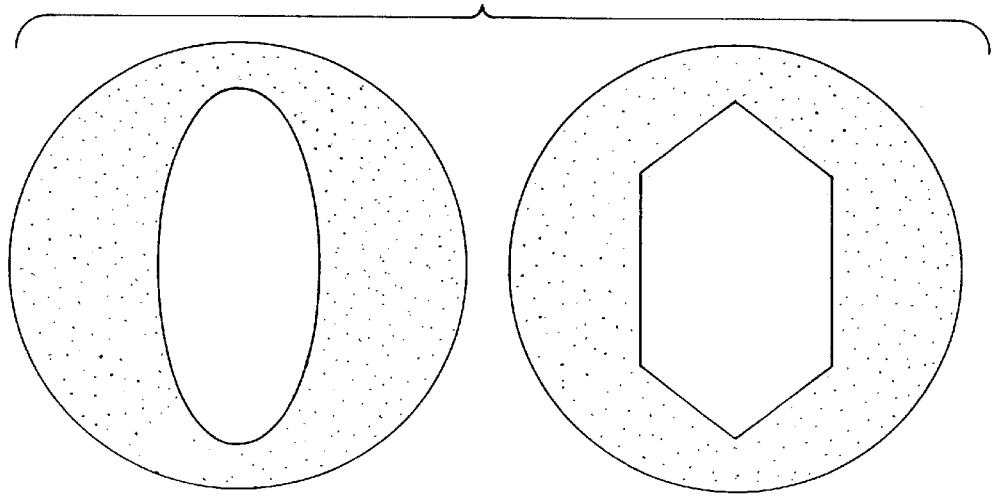

In the present apparatus, a view field may be expanded in a horizontal direction by the residual image effect of the eye, but the view field in the vertical direction is limited by the vertical length of the exit pupil 25. Thus, when a shape of the view field aperture of the optical system 2 is vertically elongated oval or rectangular as shown in FIG. 13B, the view field in the vertical direction may be expanded while the length of the exit pupil 25 in the horizontal direction is kept short as shown in FIG. 13A.

(2) Improvement of image luminance (Reduction of flicker)

When the rotary mirror is a one-side mirror, it does not contributes to the display of the image during one half period of one revolution of the mirror, and the luminance of the image decreases in average in time and the flicker becomes prominent. Accordingly, the rotary mirror is changed to a double-side mirror to double the time contributing to the display of the image, so that the luminance of the image is improved and the flicker is also reduced.

(3) Further expansion of view field in a horizontal direction

As shown in FIG. 12, the view field in the horizontal direction in the above apparatus cannot be expanded beyond 180 degrees. However, by increasing the number of optical systems for focusing the image 22, further expansion of the view field in the horizontal direction can be attained. (That is, observation of the images from the side and the rear becomes possible).

Figure 14:
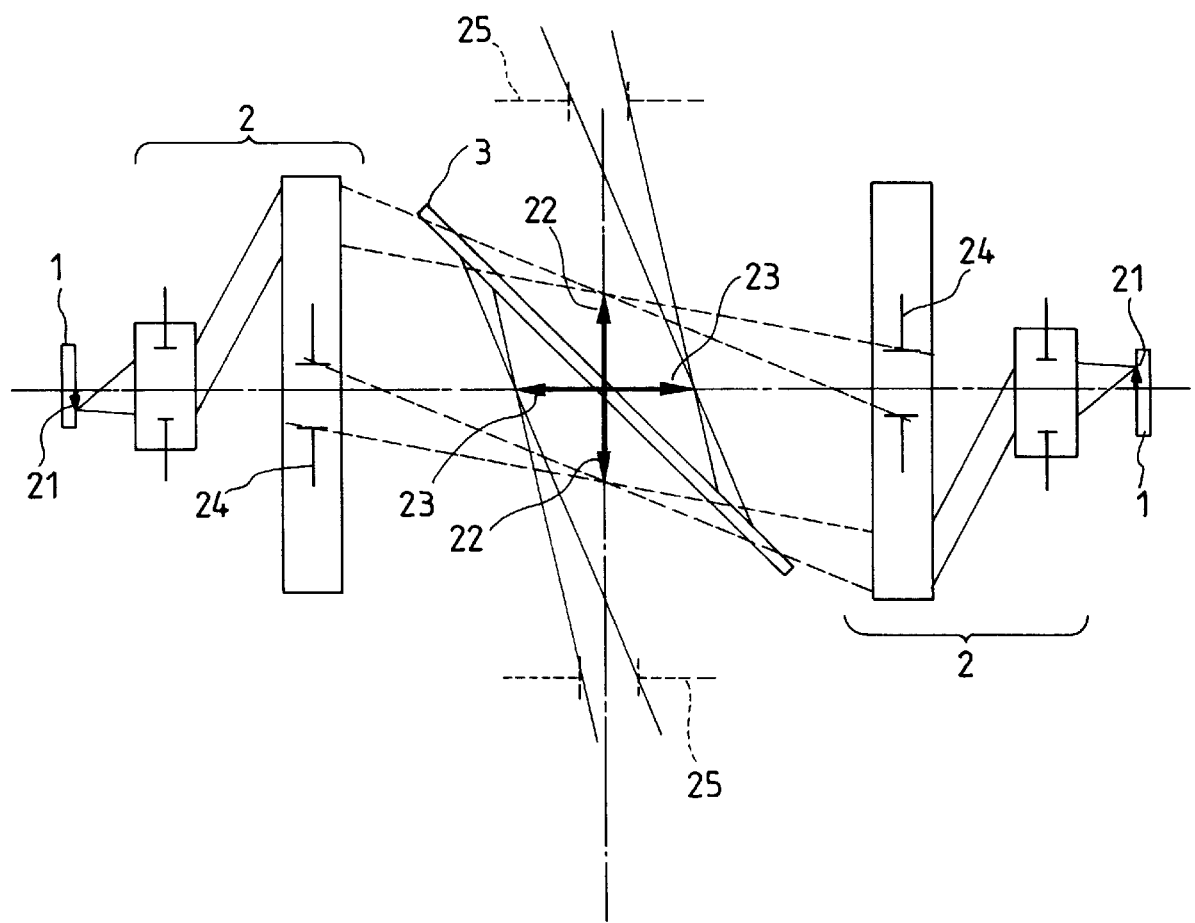
FIG. 14 shows a method for increasing the number of optical systems to expand a horizontal view field.

FIG. 14 shows an embodiment of the above method. The LCD and the focusing optical system are arranged opposingly so as to share the optical axis with the mirror being arranged therebetween. The rotary mirror is set as a double-side mirror to double the time for contributing to the display of the image. In this arrangement, since both of the above-mentioned exit pupils 25 are present at symmetrical positions with respective to the rotation axis OO', a bright image can be observed from the entire area in the horizontal direction excluding the area in which the light is eclipsed by the optical system. The number of focusing optical systems is not limited to two, and three or more focusing optical systems may be provided and the image display areas may be respectively assigned to each of the systems.

(4) Approach to high rotating speed of rotary mirror

As described above, in order to observe a flicker free display image by the present apparatus, it is necessary to rotate the rotary mirror at least 60 revolutions per second. As a result, failure of the motor and the mirror due to air resistance is anticipated.

Figure 15:
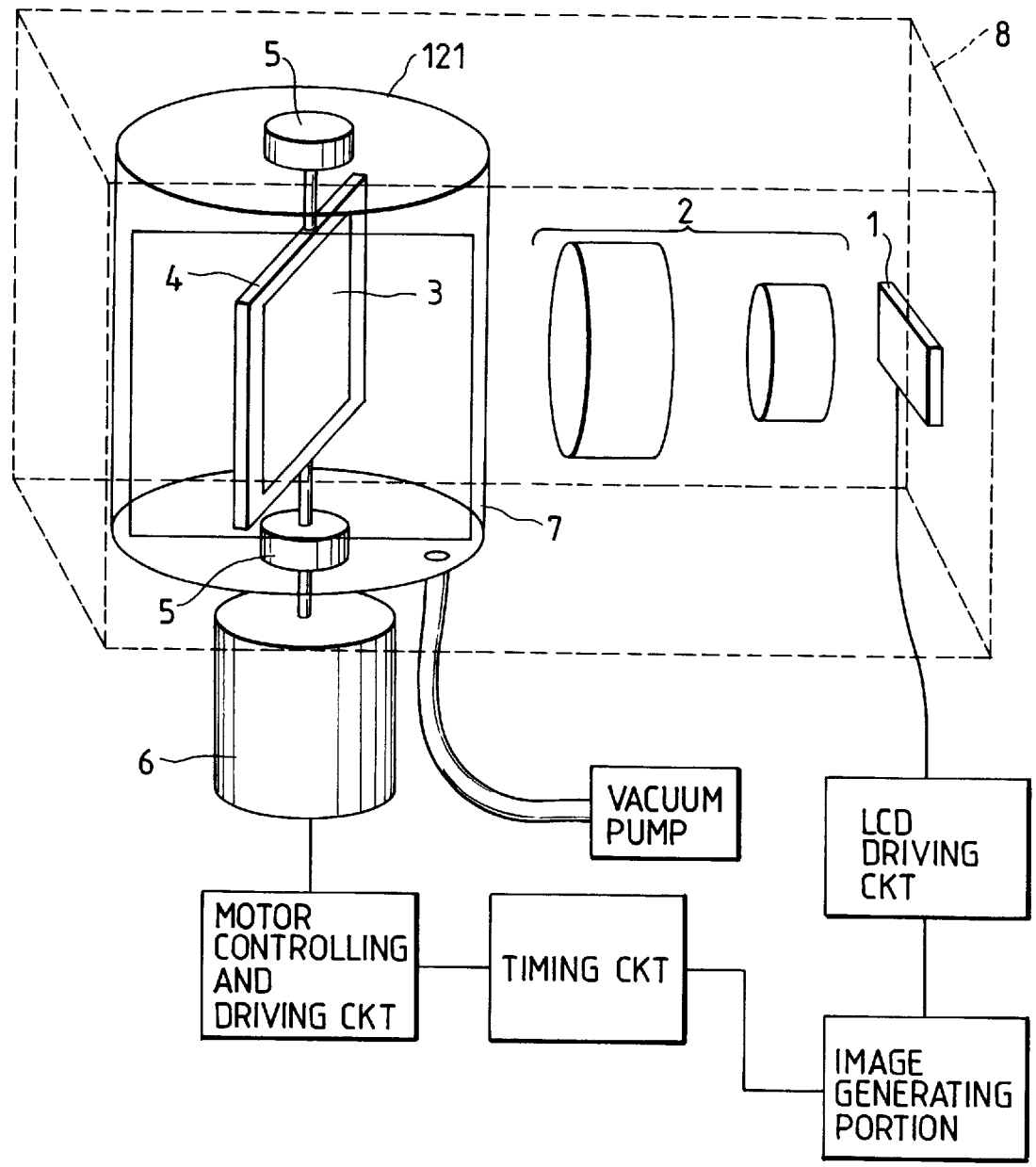
FIG. 15 shows a vacuum sealing of a rotary mirror.

By rotating the rotary mirror in a sealed container 121 which is kept at a substantially vacuum level as shown in FIG. 15, the above problem is solved.

Embodiment 2

A method for observing a stereographic image with both eyes in the apparatus having the same construction with that of the Embodiment 1 is now explained.

As described above, according to the present apparatus, the state in which the light beam emitted from the exit pupil of the optical system is incident on only the right eye of the observer and the state in which it is incident on only the left eye as the rotary mirror is rotated can be independently created in time. Accordingly, in the state in which the light beam is incident on only the right eye of the observer, the stereographic image (two images including a parallax corresponding to the right eye and the left eye) for the right eye may be displayed, and in the state in which the light is incident on only the left eye of the observer, the image for the left eye of the stereographic image may be displayed so that the observer can observe the stereographic image present near the axis of the rotary mirror by the parallax of the both eyes.

Figure 16:
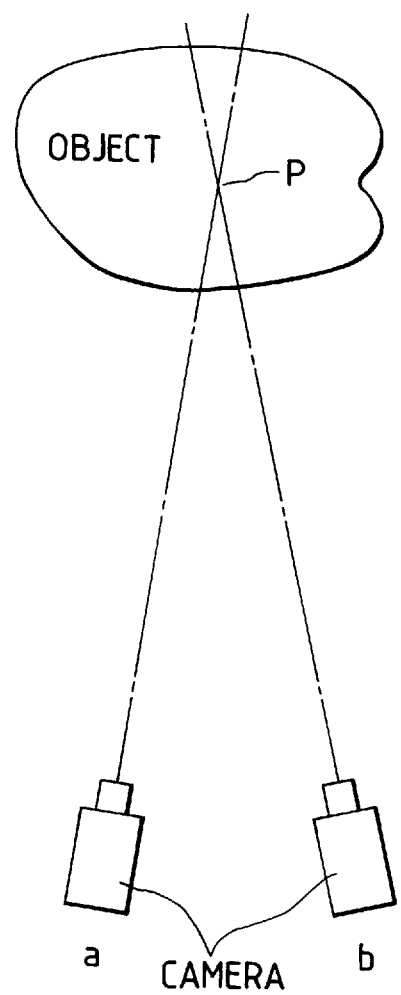
FIG. 16 shows a method for inputting a parallax image from one horizontal direction of an object.

FIG. 16 shows an input method of the stereographic image.

A camera a and a camera b are arranged with the same spacing as the width between the eyes of human and both cameras pick up the same object. An optical axis of the camera a and an optical axis of the camera b intersect at a point P.

An image picked up by the camera a and an image picked up by the camera b have a parallax therebetween, and the former forms an image for the left eye and the latter forms an image for the right eye.

Figure 17:
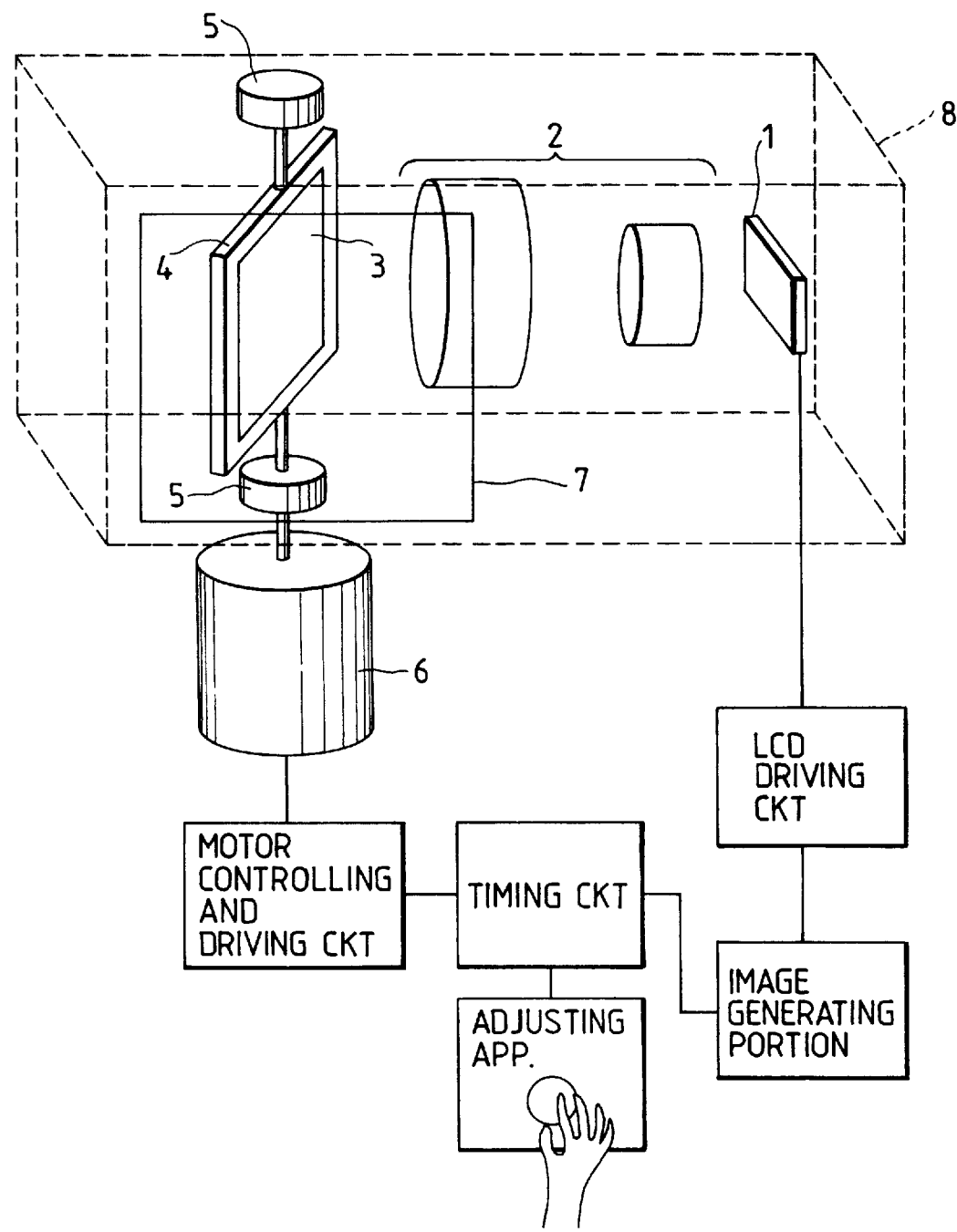
FIG. 17 shows a method for observing a stereographic image as viewed from one horizontal direction.

FIG. 17 shows a view of an apparatus for observing a stereographic image with both eyes by the display of the stereographic image.

A major construction is identical to that of the Embodiment 1 except an image display mechanism.

An adjusting apparatus is connected to the timing circuit for detecting the revolution speed and the angle of the mirror. The adjusting apparatus adjusts the timing of display of the image through the observer. The signal sent from the adjusting apparatus to the image generating portion includes a synchronization signal of the revolution of the rotary mirror and a command signal which reflects the intention of the observer. A specific function of the adjusting apparatus will be described later.

Figure 18B:
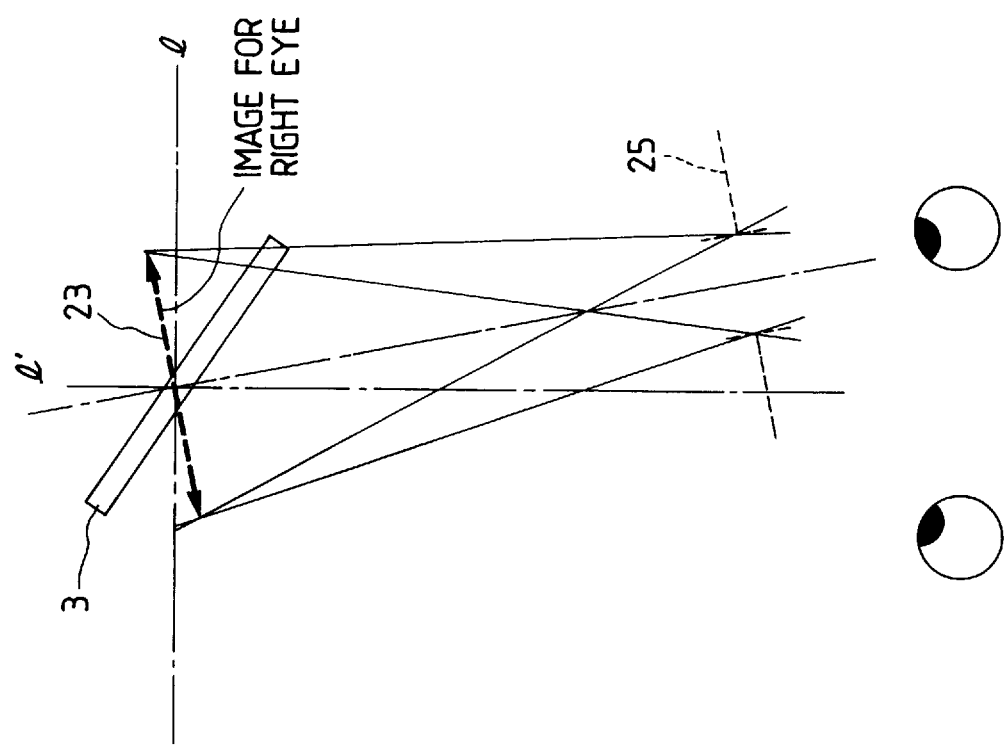
FIGS. 18A and 18B show a method for limiting an observation field by using a reciprocally moving mirror.
Figure 18A:
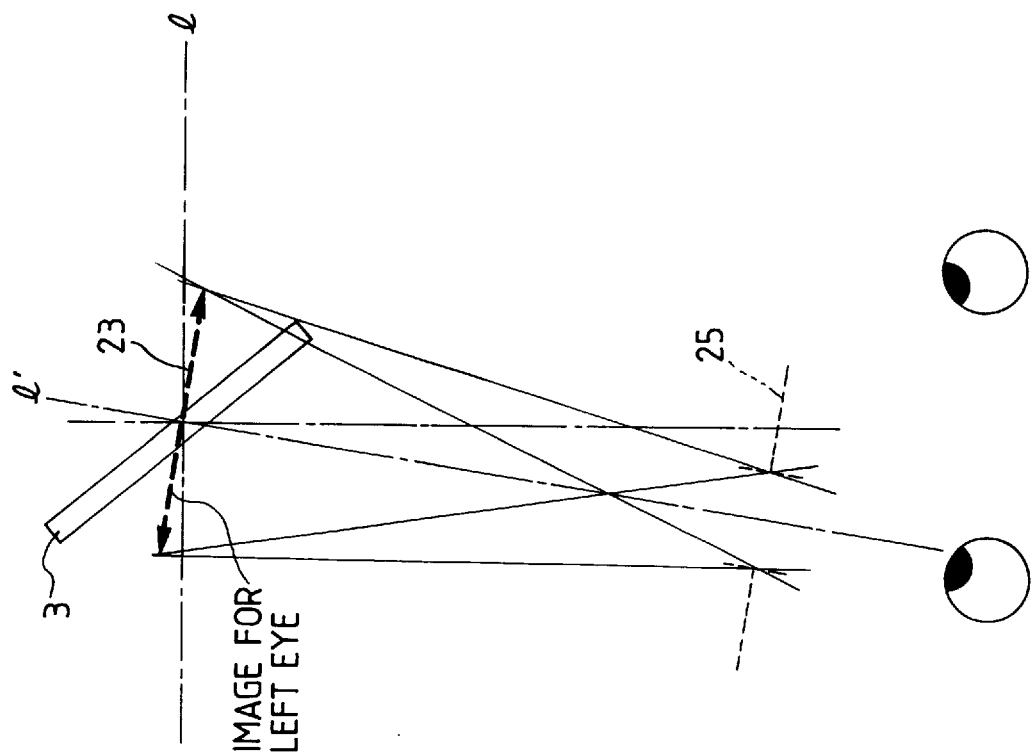

Referring to FIGS. 18A and 18B, a method for observing the stereographic image by two eyes by using the apparatus of the above construction is now explained.

As shown in FIG. 18A, the center of the image 23 is on the rotation axis of the mirror, and the direction thereof is changed in accordance with the rotation of the rotary mirror. When the direction of the optical axis l' of the image 23 and the exit pupil 25 is consistent with the direction of the optical axis of the camera a in FIG. 16, the image for the left eye is displayed on the LCD. At this time, the right eye of the observer does not observe the image.

As shown in FIG. 18B, when the direction of the optical axis l' is consistent to the direction of the optical axis of the camera b in FIG. 16, the image for the right eye is displayed on the LCD. At this time, the left eye of the observer does not observe the image.

Since the observer independently observes the image for the left eye and the image for the right eye by the respective eyes sequentially or alternately, the observer can recognize the stereographic image near the rotary mirror by the parallax of both eyes.

However, since the both eyes of the observer are not always at the predetermined positions, the timing to display the images for the left eye and the right eye must be changed in accordance with the positions of the both eyes of the observer. Accordingly, the observer adjusts the timing to display the images by the adjusting apparatus to observe the stereographic image while the observer is observing the image. The detection of the positions of the both eyes of the observer may be automated so that a sharp stereographic image can be observed even if the position of the observer more or less changes.

Figure 19:
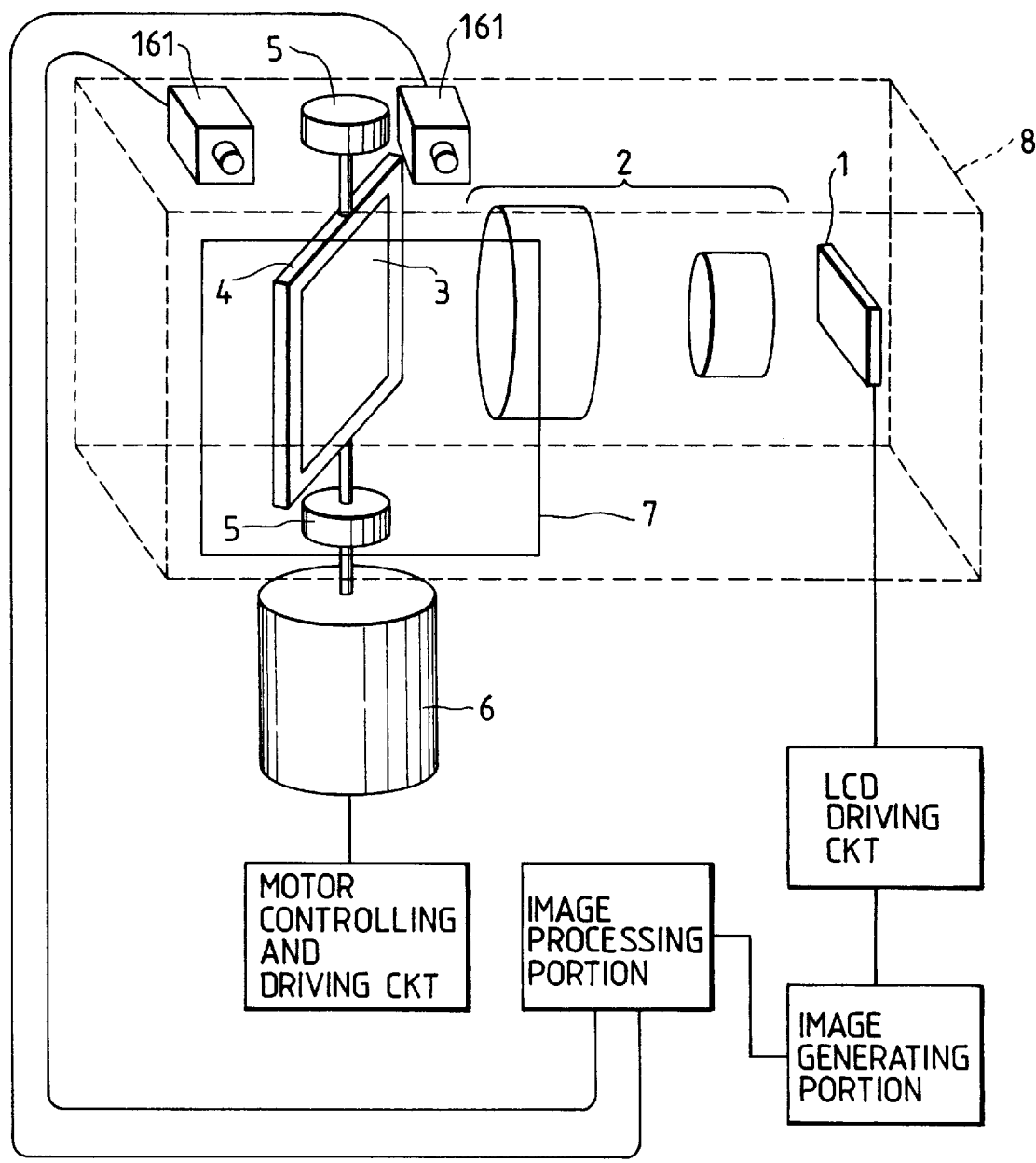
FIG. 19 shows a view when observer pupil position detection means is provided in the apparatus of the present invention.

FIG. 19 shows an example which is equipped with the automated detection mechanism of the positions of both eyes of the observer in the present apparatus.

Numeral 161 denotes a both-eye camera which is always fixed relative to the rotation axis of the rotary mirror. The both-eye camera picks up the observer and sends an image of the observer to an image processing portion. The image processing portion detects the positions of the both eyes of the observer by real time image processing, calculates a condition under which the observer can observe a sharp image at this time, and sends timing information of the display of correct image to the image generation unit. Alternatively, a motor control and drive circuit for the rotary motor is controlled so as to direct the image from the rotary mirror to the pupil of the observer so that the observer can observe a sharp stereographic image. Thereby, the adjustment is automatically made such that the sharp stereographic image can be observed even if the position of the observer changes.

The stereographic image display method has been described. In accordance with the present apparatus, not only the stereographic image for the both eyes is displayed but also the stereographic image which permits the observation from various angles in a horizontal direction can be reproduced.

Figure 20:
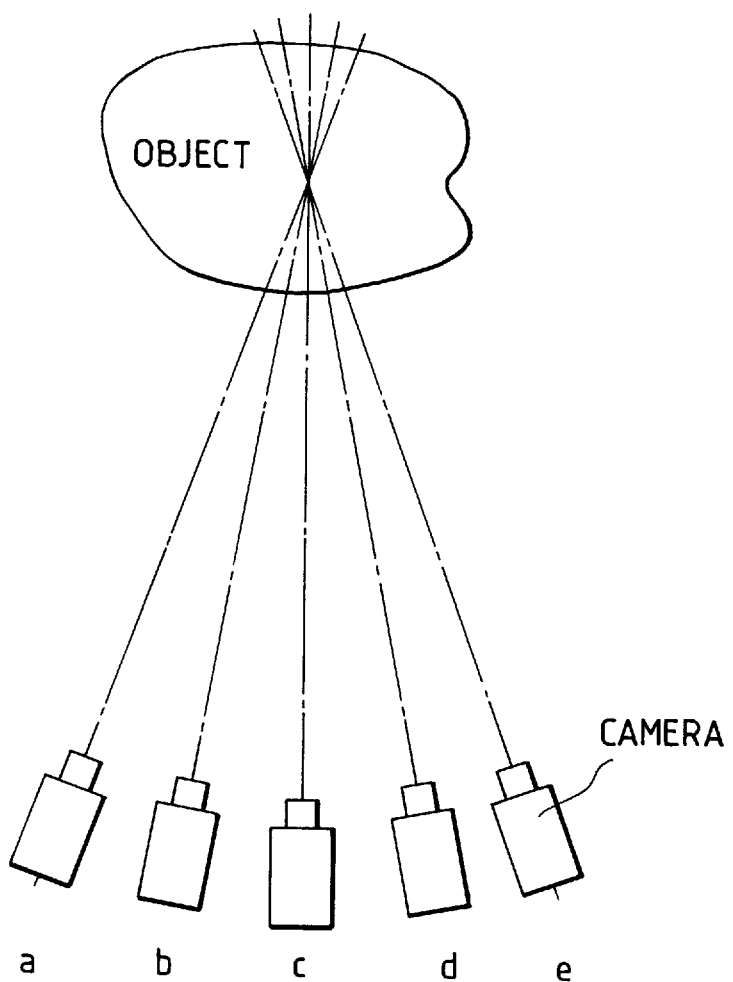
FIG. 20 shows a method for inputting parallax images from various angles in a horizontal direction of a stereographic object.

This method is now explained. An object is picked up from various angles in a horizontal direction as shown in FIG. 20. In FIG. 20, parallax images are inputted from five directions a to e.

In a reproduction mode, it is preferable that those parallax images are reproduced in the same condition as that of the image pick-up.

As shown in FIG. 21A, when the direction of the optical axis 1' of the image 23 and the exit pupil 25 is consistent to the direction of the optical axis in the image pick-up mode in FIG. 20A, the image a is displayed on the LCD.

As shown in FIG. 21B, when the direction of the optical axis 1' of the image 23 and the exit pupil 25 is consistent to the direction of the optical axis in the image pick-up mode in FIG. 20B, the image b is displayed on the LCD.

In this manner, the images a to e are sequentially and synchronously switched and displayed in accordance with the direction of the optical axis 1' of the image 23 and the exit pupil 25, the parallax images from five directions can be displayed.

When a spacing between the cameras when the parallax image is inputted is more narrowed or a range of installation of the cameras is more spread and the reproduction is made in the manner described above, a smooth (continuously observable) stereographic image can be observed from various angles in the horizontal direction.

Since the commonly recognized permitted residual image time of the eye is approximately $1/60$ second, the flicker free sharp moving image can be observed by rotating the mirror at approximately 60 revolutions per second. However, in a case where the stereographic image display is employed, it is necessary that the display image of the LCD must be switched a direction of from the position at which the image 23 directly faces the right eye of the observer to the position at which it directly faces the left eye.

While the method for observing the smooth (continuously observable) stereographic image from various horizontal angles by using the present apparatus has been explained with reference to FIGS. 20, 21A and 21B, it is difficult from the standpoint of the number of cameras required to pick up an image to execute the above method in the entire possible image displayable area. Accordingly, the mirror may be moved in a limited view field area to reduce the number of parallax images to be prepared.

Figure 22:
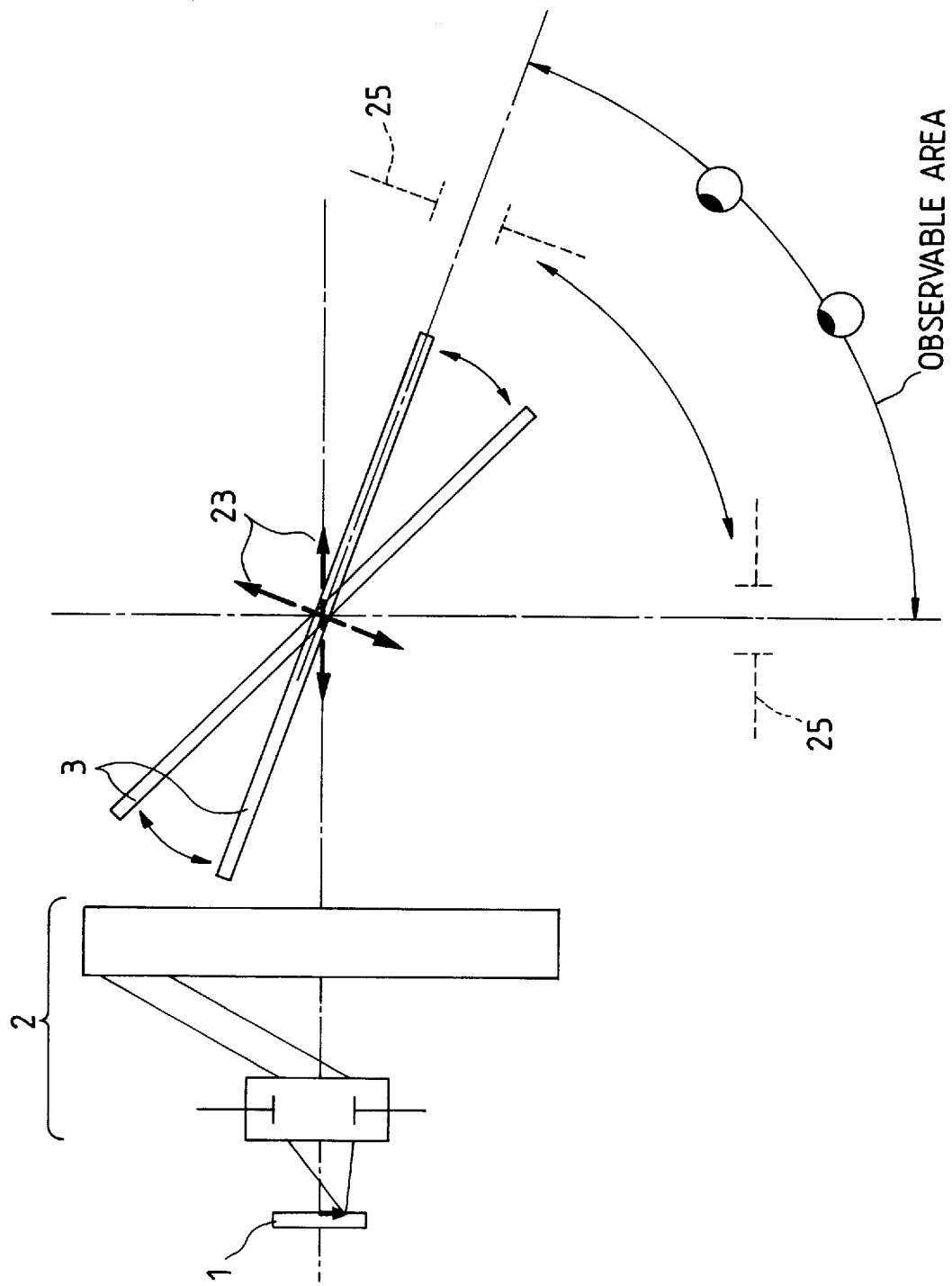
FIG. 22 shows a view when a reciprocally moving mirror is applied to the apparatus of the present invention.

As shown in FIG. 22, instead of the rotary mirror, a mirror which reciprocally moves in a limited angle may be sued in the present apparatus to reduce a load burden in inputting a parallax images and a load burden in switching over the display image of display such as LCD.

Figure 23:
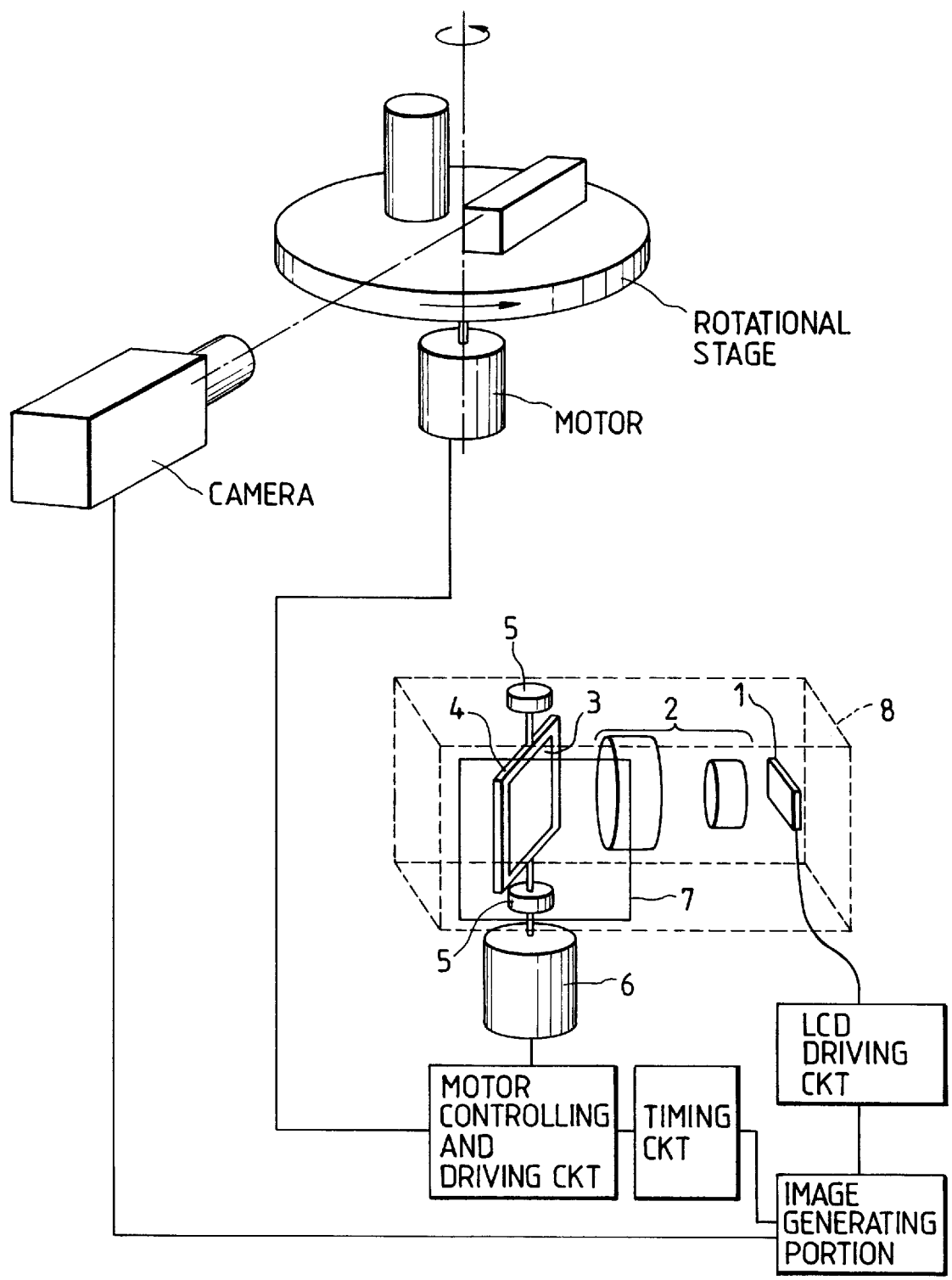
FIG. 23 shows a method for inputting parallax images from various angles in a horizontal direction of a stereographic object by one camera.

A load burden can also be reduced in inputting the parallax image. The input of the images from multiple view points by a plurality of cameras is restricted on cost and space. As shown in FIG. 23, a stereographic object is mounted on a rotary table and rotated in synchronism with the rotary mirror, and the state is picked up by one camera. Thus, an image information which is equivalent to the image information picked up by a number of cameras around 360 degrees in a horizontal direction to pick up images of different view points sequentially is attained. In order to observe a natural and stereographic image, a ratio of the rotating speed of the rotary table and the rotating speed of the mirror are set to be 2/1 because when the mirror is rotated by $\theta$, the optical axis is rotated by $2\theta$. For example, assuming the rotating speed of the rotary table is 120 revolutions per second and a shutter speed of the pick-up camera is $1/43200$ second, 21600 parallax images are produced per second at an interval of 1 degree in a horizontal direction, and the image signal is transmitted at a rate of $1/43200$ second to display it on a display device which can display the image at the rate of $1/43200$ second. By setting the rotating speed of the rotary mirror to 60 revolutions per second, the stationary images of the stereographic object can be viewed from various angles in the horizontal direction.

By delaying or advancing only display timing without changing the frequency of the image display, the stereographic images from various directions can be observed while the observation position of the observer is fixed.

Figure 24:
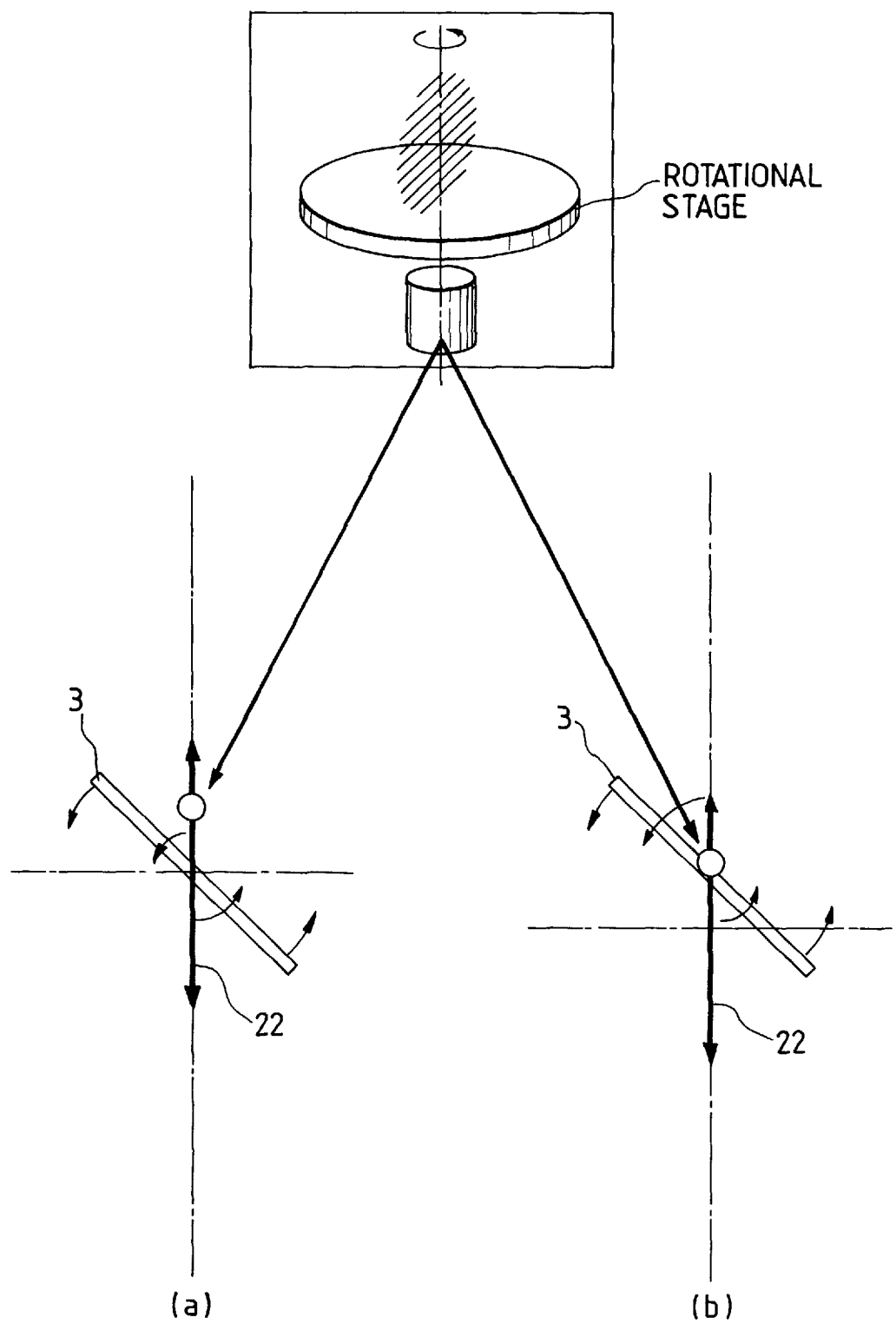
FIG. 24 shows a method for observing stereographic images as viewed from various angles in a horizontal directions.

By intentionally producing a relative difference between the rotating speed of the rotary mirror and the rotating speed of the rotary table on which the stereographic object is mounted, the object rotating by the relative rotating speed can be observed. When the present parallax image input method is employed, the image displayed on the LCD becomes the moving image of the rotating object, but the natural stereographic image can not be reproduced if the position of the rotation axis of the moving image is not consistent with the rotation axis of the rotary mirror as shown in FIG. 24A. Thus, as shown in FIG. 24B, it is preferable that the positions of the LCD and the focusing optical system are adjusted so that the position of the rotation axis of the moving image is not consistent with the rotation axis of the rotary mirror.

In accordance with the present parallax image input method, the construction of the image generating portion can be simplified, and if the flicker is permitted (if the mirror rotating speed is lowered to cope with the slower image display switching over), the stereographic image can be recorded and reproduced by using the simple image pick-up and display system using the existing video signal, and the use of the existing communication and broadcasting system also can be permitted.

Since the existing video system records the parallax images at a rate of 60 images per second, the parallax images are recorded and reproduced at an interval of 6n degree if the rotating speed of the rotary table and the rotary mirror is defined as n. For example, if the rotating speed of the rotary table and the rotary mirror is defined as 2 revolutions per second, the parallax images can be recorded and reproduced at the interval of 12 degrees. While the flicker is fairly prominent, it significantly reduces the load burden compared with the manpower required to pick up the object by arranging a number of TV cameras at the interval of 12 degrees.

The following two methods describe the other methods for reducing the number of cameras in inputting the parallax images.

First, a screen image from a view point between cameras is created by interpolation of the image processing technique to produce more parallax images than those of the actually installed cameras.

For example, as shown in FIG. 20, where five cameras are used for the pick-up, four images from view points between the cameras are interpolated so that 21 parallax images can be obtained by using five cameras.

Secondly, the camera is provided with a moving mechanism and the images are picked up at intervals of time during movement of the moving mechanism whereby the same effect as that attained by a number of cameras can be produced.

Figure 25:
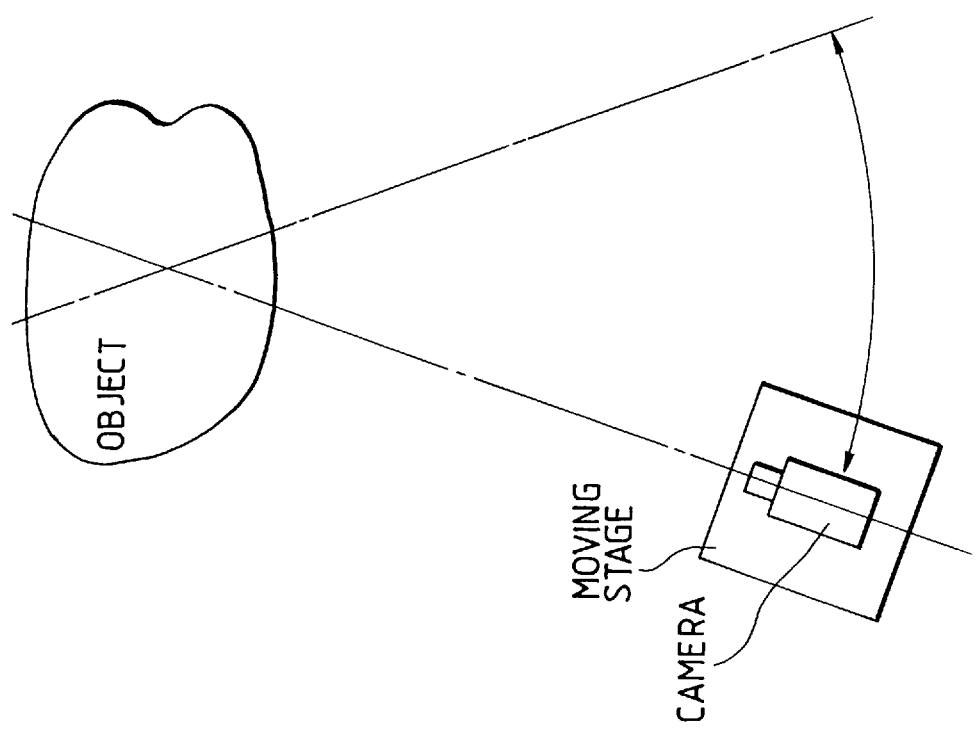
FIG. 25 shows a method for inputting parallax images from various horizontal angle of a stereographic object.

FIG. 25 shows the present image pick-up method. The camera for picking up the object is one but it is mounted on a moving table which is moved horizontally while drawing an arcuate track so as to keep the distance to the object constant. Thus, the existing position of the camera changes at each time, and several images from different view points can be produced by operating the shutter of the camera at different times.

Figure 26:
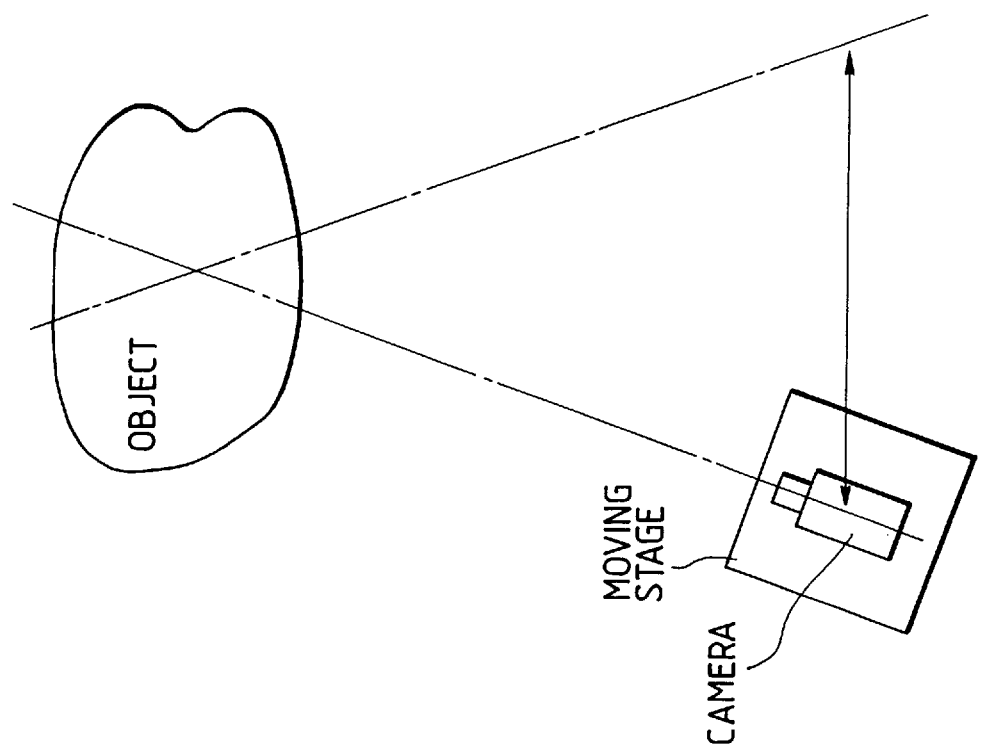
FIG. 26 shows a method for inputting parallax images from various angles in a horizontal direction of a stereographic object.

When the distance to the object is not constant, it is not possible to determine the radius of arc of the locus of the moving table. Thus, even when the radius of arc is changed in accordance with the distance to the object or a linear locus is drawn as shown in FIG. 26, substantially same parallax image can be inputted.

By providing a plurality of cameras and assigning respective moving areas, more efficient parallax image input is attained.

Instead of all real images, computer graphics (CG) or animation or the like may be used so that the space for the pick-up cameras is saved and the burden in inputting the image is significantly reduced.

Embodiment 3

Figure 27:
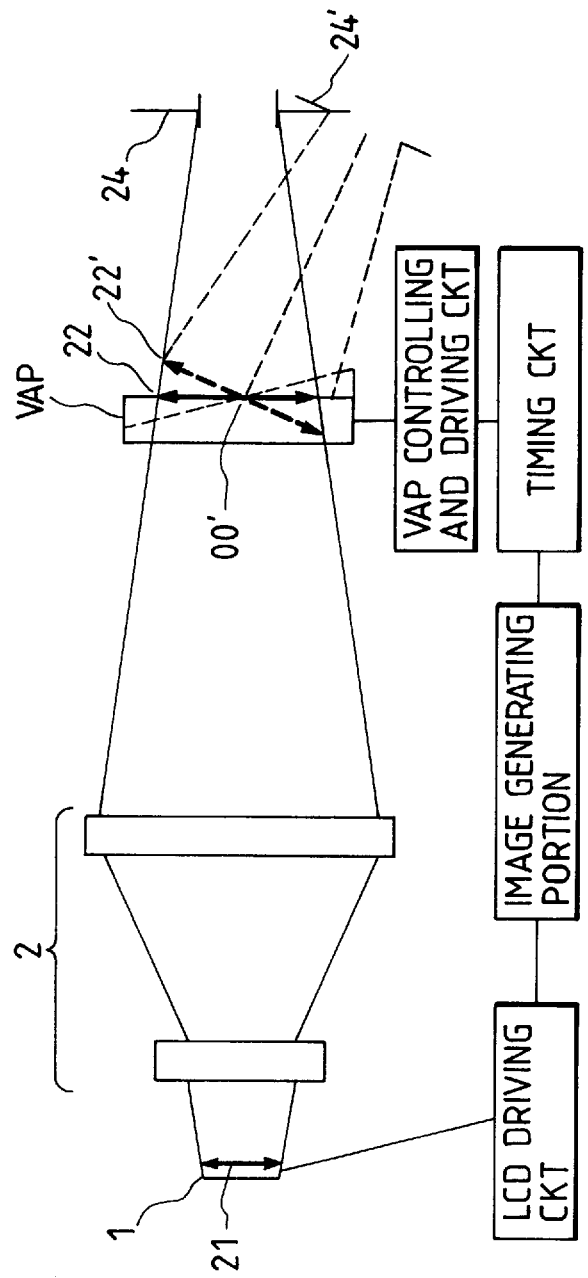
FIG. 27 shows a view when a VAP is applied to the apparatus of the present invention.

Instead of using the rotary mirror as in the Embodiments 1 and 2, an Embodiment 3 shown in FIG. 27 uses a VAP (variable angle prism). Except the substitution of the rotary mirror by the VAP, the construction is basically identical to that of the Embodiments 1 and 2.

The VAP is an optical element which deflects a light beam as a general prism does, but since an apex angle thereof can be changed, a deflective angle of the light beam can be freely controlled.

Figure 28A:
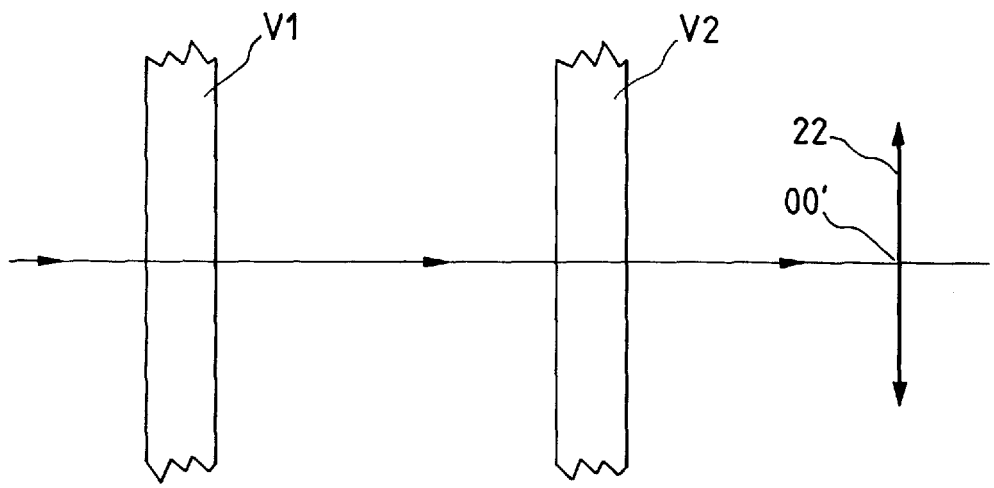
FIGS. 28A and 28B show views when two VAPs are applied to the apparatus of the present invention.
Figure 28B:
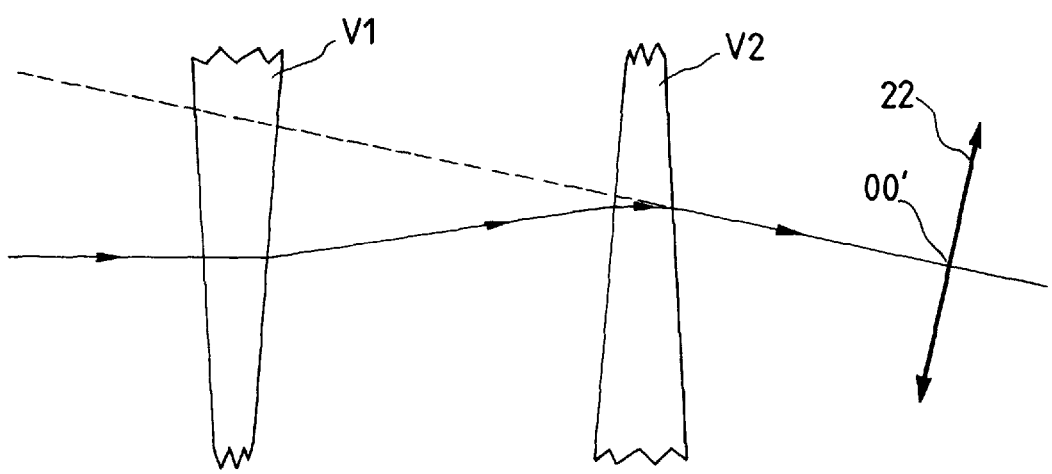

In FIG. 27, an element 21 on the LCD forms an image 22 on the VAP through the focusing optical system 2. Numeral 24 denotes an exit pupil. The VAP is connected to a VAP control and drive circuit which changes the apex angle in synchronism with a timing signal sent from a timing circuit. As the apex angle is changed, the image 22 is changed to an image 22' by the rotating movement around the center axis OO'. The exit pupil 24 is also moved to 24' by the rotating movement around the center axis OO'. As a result, the image 22 and the exit pupil 24 offer the same effect as that attained by using the rotary mirror in the embodiments 1 and 2. The driving portions of the rotary mirror become much less and safety to the observer is improved and the size of the apparatus is suppressed. Two VAPs can be used as shown in FIGS. 28A and 28B.

The present invention may be embodied in other specific forms without departing from the spirit or essential characteristics thereof. The present embodiments are therefore to be considered in all aspects as illustrative and not restrictive the scope of the invention being indicated by the appended claims rather than the forgoing description and all changes which come within the meaning and range of equivalency of the claims are therefore intended to be embraces therein.

What is claimed is:

1. An image display apparatus which allows an observer to recognize a stereoscopic image comprising:

display means for displaying an image by emitting a light;

a focusing optical system for focusing the image displayed on said display means, upon an image surface wherein a width of an exit pupil of said focusing optical system in a horizontal direction is smaller than a predetermined width between both eyes of said observer; and image surface moving means for rotating said image surface around a single axis in said image surface as a rotation axis, so that said exit pupil of said focusing optical system is rotated around said single axis with regard to the observer.

2. An image display apparatus according to claim 1, wherein said image surface moving means includes a mirror rotatable around said rotation axis as a rotation axis.

3. An image display apparatus according to claim 1, wherein said image surface moving means includes a variable angle prism.

4. An image display apparatus according to claim 1, wherein said display means includes means for displaying an image corresponding to the rotated position of the image surface.

5. An image display apparatus according to claim 1 further comprising:

detecting means for detecting positions of both eyes of an observer observing the image reproduced on said image surface; and controlling means for controlling said image surface moving means on the basis of detected result by said detecting means.

6. An image display apparatus according to claim 1 further comprising:

means for adjusting a shape of an exit pupil of said focusing optical system.

7. An image display apparatus according to claim 1, wherein a shape of an exit pupil of said focusing optical system is longer in a direction of the rotation axis than in a direction normal to the rotation axis.

8. An image display apparatus according to claim 1, wherein an exit pupil of said focusing optical system is located closer to an observer observing the image reproduced on said image surface relative to said image surface.

9. An image display apparatus according to claim 1, wherein said image surface moving means requires no longer than 1/30 second to rerotate the image surface to the same rotation position.

10. An image display apparatus according to claim 1, wherein said display means by a predetermined order displays images of an object picked up from different positions.

11. An image display apparatus according to claim 1, wherein at least two sets of said display means and said focusing optical system are included for said single image surface moving means.

12. An image display apparatus according to claim 1, wherein the image displayed on said display means is an image picked up by relatively rotating an object and moving image pick-up means around a predetermined axis as a rotation axis.

13. An image display apparatus according to claim 12, wherein said image pick-up means is fixed.

14. A method for displaying an image which allows an observer to recognize a stereoscopic image comprising the steps of:

displaying an image by emitting a light by a display device;

focusing the image displayed on said display device by a focusing optical system, upon an image surface;

setting a width of an exit pupil of said focusing optical system in a horizontal direction so that the width thereof is smaller than a predetermined width between both eyes of said observer; and rotating said image surface around a single rotation axis in the image surface as a rotation axis, so that the exit pupil of said focusing optical system is rotated around said single axis with regard to the observer.

15. A method for displaying an image according to claim 14, wherein said step of moving the image surface includes a step of rotating a mirror around said rotation axis as a rotation axis.

16. A method for displaying an image according to claim 14, wherein said step of moving the image surface includes a step of changing an apex angle in a variable angle prism.

17. A method for displaying an image according to claim 14, wherein said step of displaying includes a step of displaying an image corresponding to the rotation position of said image surface.

18. A method for displaying an image according to claim 16 further comprising the steps of:

detecting positions of both eyes of an observer observing the image reproduced on said image surface; and controlling the image surface movement on the basis of the detection result.

19. A method for displaying an image according to claim 14 further comprising the steps of adjusting a shape of an exit pupil of said focusing optical system.

20. A method for displaying an image according to claim 14, wherein a shape of an exit pupil of said focusing optical system is longer in a direction of said rotation axis than in a direction normal to said rotation axis.

21. A method for displaying an image according to claim 14, wherein an exit pupil of said focusing optical system is located closer to an observer observing an image reproduced on said image surface with respect to said image surface.

22. A method for displaying an image according to claim 14, wherein a time required to relocate the image surface to the same rotation position is no longer than 1/30 second.

23. A method for displaying an image according to claim 14, wherein said step of displaying by a predetermined order displays images of an object picked up from different positions.

24. A method for displaying an image according to claim 14, wherein the image displayed on said display is an image picked up by relatively rotating an object and a moving image pick-up device around a predetermined axis as a rotation axis.

25. A method for displaying an image according to claim 24, wherein said image pick-up device is fixed.

* * * * *